US012047972B2

(12) United States Patent
Chande et al.

(10) Patent No.: US 12,047,972 B2
(45) Date of Patent: Jul. 23, 2024

(54) SCHEDULING RESOURCES FOR MULTIPLE TRANSMISSION CONFIGURATION INDICATOR STATES IN MULTIPLE TRANSMISSION TIME INTERVALS USING SINGLE DOWNLINK CONTROL INFORMATION

(71) Applicant: QUALCOMM Incorporated, San Diego, CA (US)

(72) Inventors: Vinay Chande, San Diego, CA (US); Arumugam Chendamarai Kannan, San Diego, CA (US); Xiaoxia Zhang, San Diego, CA (US); Jing Sun, San Diego, CA (US); Mostafa Khoshnevisan, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/190,411

(22) Filed: Mar. 27, 2023

(65) Prior Publication Data

US 2023/0232414 A1    Jul. 20, 2023

Related U.S. Application Data

(63) Continuation of application No. 17/093,466, filed on Nov. 9, 2020, now Pat. No. 11,638,243.
(Continued)

(51) Int. Cl.
*H04W 72/12* (2023.01)
*H04L 5/00* (2006.01)
(Continued)

(52) U.S. Cl.
CPC ........... *H04W 72/23* (2023.01); *H04L 5/0005* (2013.01); *H04W 72/0446* (2013.01); *H04W 72/1273* (2013.01)

(58) Field of Classification Search
CPC ..... H04L 5/0005; H04L 5/001; H04L 5/0023; H04L 5/0044; H04L 5/0094;
(Continued)

(56) References Cited

U.S. PATENT DOCUMENTS 10,397,940 B2    8/2019    Krishnamoorthi et al.
2019/0334688 A1*  10/2019   Kwak ................... H04W 72/23
(Continued)

FOREIGN PATENT DOCUMENTS

EP    3780839 A1 *  2/2021  ........... H04L 5/0053
EP    3780839 A1     2/2021
(Continued)

OTHER PUBLICATIONS

CATT: "Remaining Issues on Multi-TRP/Panel Transmission", 3GPP Draft, R1-1912176, 3GPP TSG RAN WG1 #99, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823254, 21 Pages (Year: 2019).*
(Continued)

*Primary Examiner* — Lan-Huong Truong
(74) *Attorney, Agent, or Firm* — Kevin M. Donnelly; Harrity & Harrity, LLP

(57)    ABSTRACT

Various aspects of the present disclosure generally relate to wireless communication. In some aspects, a user equipment (UE) may receive single downlink control information (DCI) that indicates resources for a plurality of transmission configuration indicator (TCI) states for transmitting or receiving communications in a plurality of transmission time intervals (TTIs). The UE may transmit or receive the com-
(Continued)

munications in the plurality of TTIs in accordance with the DCI. Numerous other aspects are provided.

30 Claims, 20 Drawing Sheets

Related U.S. Application Data

(60) Provisional application No. 62/936,233, filed on Nov. 15, 2019.

(51) Int. Cl.
    *H04W 72/0446*    (2023.01)
    *H04W 72/1273*    (2023.01)
    *H04W 72/23*    (2023.01)

(58) Field of Classification Search
    CPC .. H04L 5/0007; H04L 5/0048; H04W 72/042; H04W 72/0446; H04W 72/1273; H04W 72/1289
    See application file for complete search history.

(56) References Cited

U.S. PATENT DOCUMENTS

| | | |
|---|---|---|
| 2020/0100225 A1 | 3/2020 | Khoshnevisan et al. |
| 2021/0153175 A1 | 5/2021 | Chande et al. |
| 2022/0095304 A1* | 3/2022 | Muruganathan ...... H04W 72/23 |
| 2022/0104185 A1 | 3/2022 | Moon et al. |
| 2022/0167279 A1 | 5/2022 | Zhou et al. |

FOREIGN PATENT DOCUMENTS

| | | | |
|---|---|---|---|
| WO | 2018022216 | 2/2018 | |
| WO | WO-2021033118 A1 * | 2/2021 | ............... H04L 1/08 |

OTHER PUBLICATIONS

CATT: "Remaining Issues on Multi-TRP/Panel Transmission", 3GPP Draft, R1-1912176, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823254, 21 Pages, Section 4, Scheme 1, p. 18, Proposal 21.
International Preliminary Report On Patentability—PCT/US2020/070762—The International Bureau of WIPO—Geneva, Switzerland—dated May 27, 2022.
International Search Report and Written Opinion—PCT/US2020/070762—ISA/EPO—dated Feb. 24, 2021.
Nokia, et al., "Enhancements on Multi-TRP/Panel Transmission", 3GPP Draft, R1-1910915, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 4, 2019 (Oct. 4, 2019), XP051808297, 26 Pages, Section 2, First Sub-Section "Agreements", Section 3.3., Section "4. Multi-TRP Transmission to Support URLLC".
Nokia, et al., "Enhancements on Multi-TRP/Panel Transmission", R1-1909209, 3GPP Tsg Ran WG1 #98 Meeting, 3rd Generation Partnership Project, Mobile Competence Centre, 650, Route Des Lucioles, F-06921 Sophia-Antipolis Cedex, France, vol. Ran WG1. no. Prague, CZ, 20190526 - 20190830, Aug. 16, 2019, XP051765814, 31 Pages, Section 2, First Sub-Section "Agreements", Section 3. 3, Section "4. Multi-TRP Transmission to Support URLLC", Section 2-4.

* cited by examiner

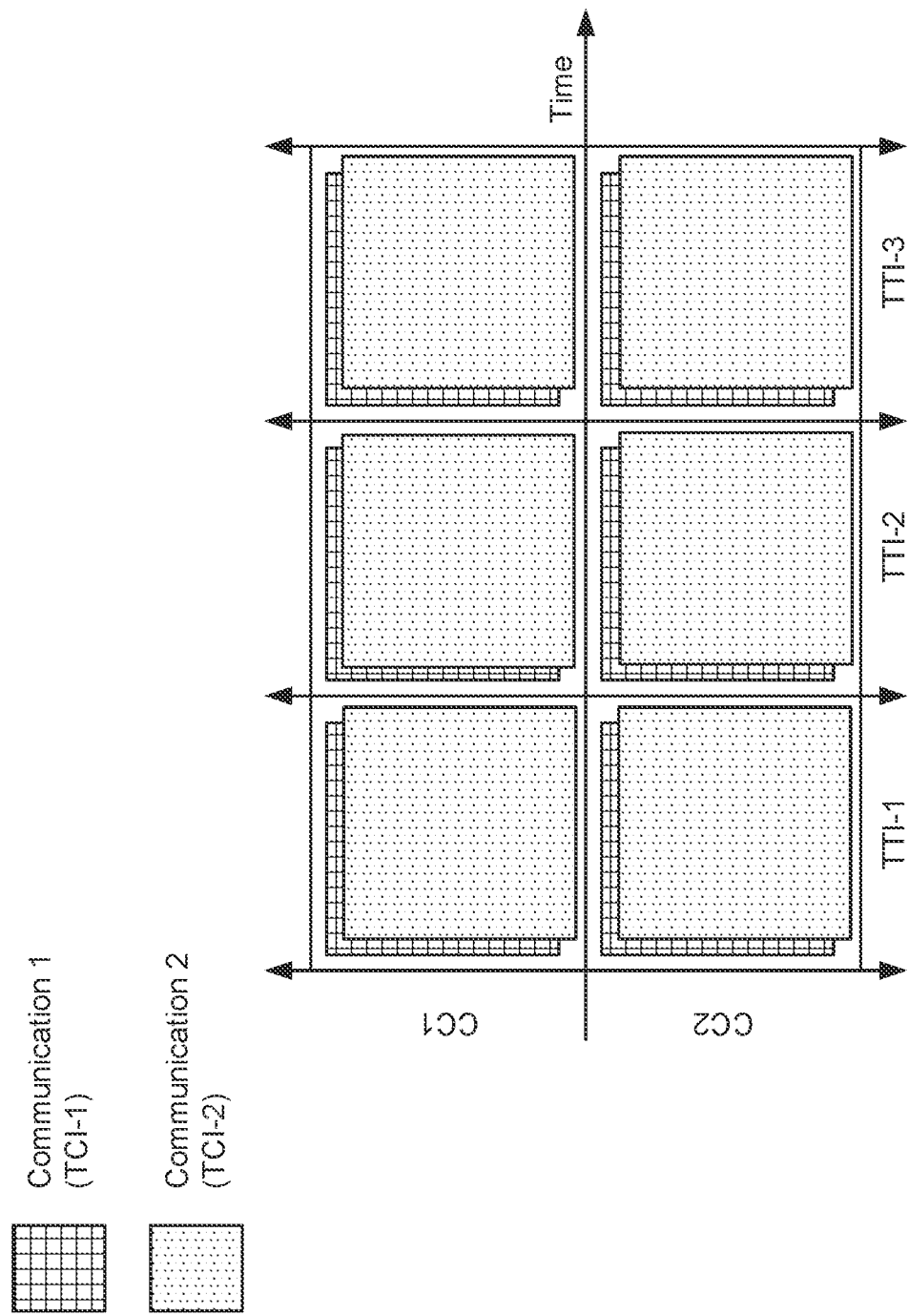

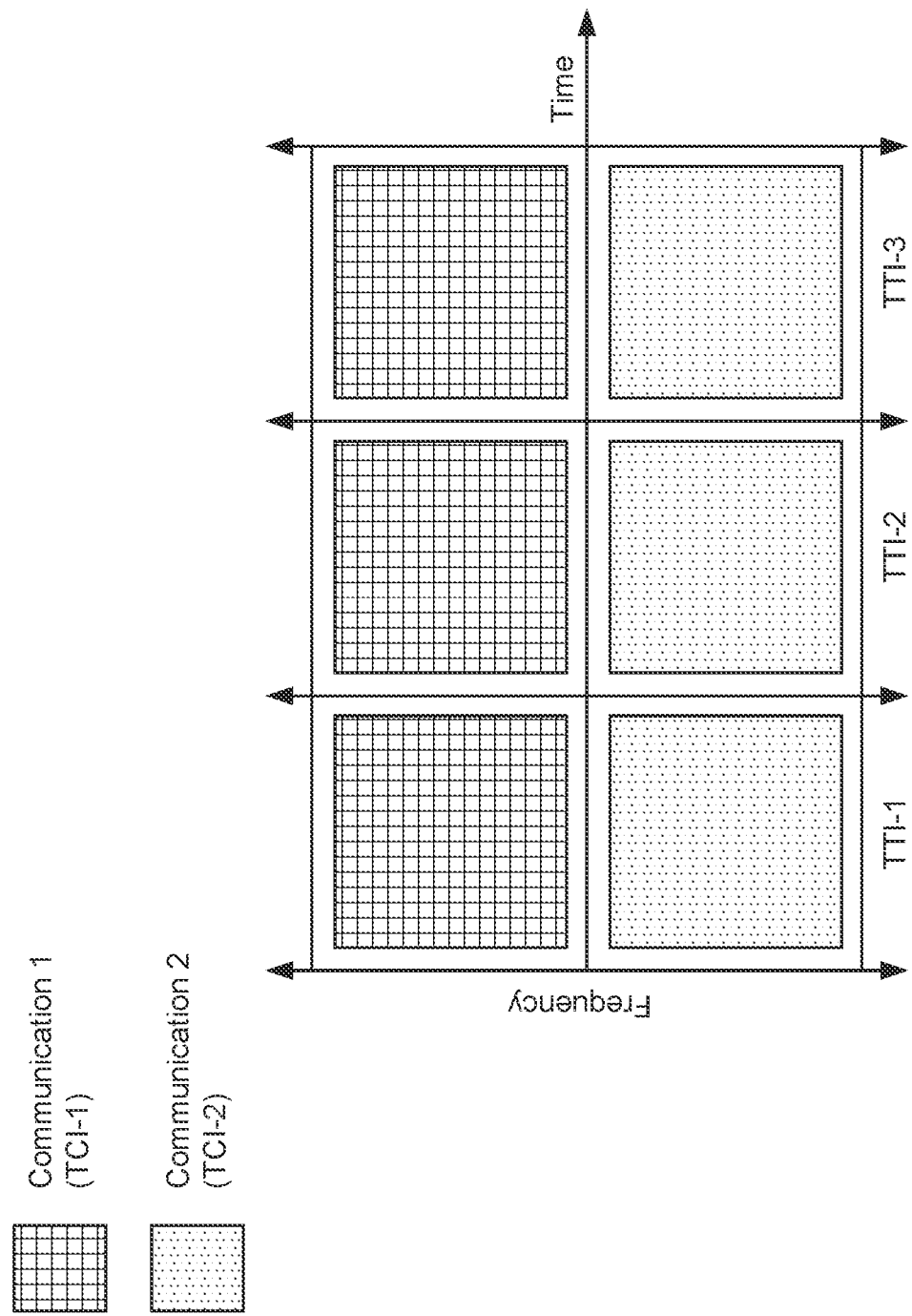

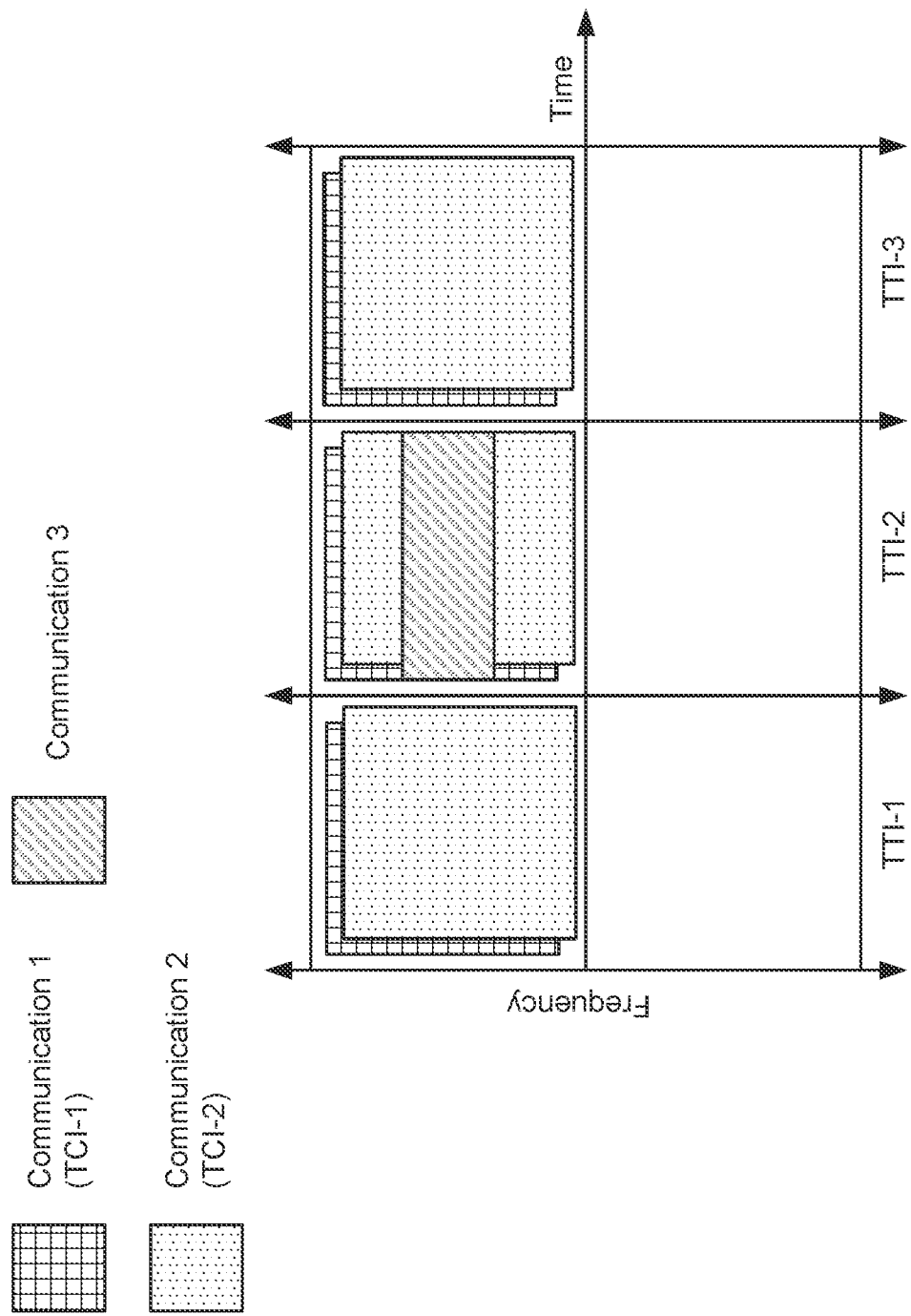

SCHEDULING RESOURCES FOR MULTIPLE TRANSMISSION CONFIGURATION INDICATOR STATES IN MULTIPLE TRANSMISSION TIME INTERVALS USING SINGLE DOWNLINK CONTROL INFORMATION

CROSS-REFERENCE TO RELATED APPLICATIONS

This Patent Application is a continuation of U.S. patent application Ser. No. 17/093,466, filed Nov. 9, 2020, entitled "SCHEDULING RESOURCES FOR MULTIPLE TRANSMISSION CONFIGURATION INDICATOR STATES IN MULTIPLE TRANSMISSION TIME INTERVALS USING SINGLE DOWNLINK CONTROL INFORMATION," which claims priority to U.S. Provisional Patent Application No. 62/936,233, filed on Nov. 15, 2019, entitled "SCHEDULING RESOURCES FOR MULTIPLE TRANSMISSION CONFIGURATION INDICATOR STATES IN MULTIPLE TRANSMISSION TIME INTERVALS USING SINGLE DOWNLINK CONTROL INFORMATION," and assigned to the assignee hereof. The contents of which are incorporated herein by reference in their entireties.

FIELD OF THE DISCLOSURE

Aspects of the present disclosure generally relate to wireless communication and specifically, to techniques and apparatuses for scheduling resources for multiple transmission configuration indicator (TCI) states in multiple transmission time intervals (TTIs) using single downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some wireless communication systems, communications associated with a UE may be scheduled in multiple transmission time intervals (TTIs) by respective separate downlink control information (DCI). Moreover, in some examples, each DCI may indicate a respective transmission configuration indicator (TCI) state associated with a beam that the UE is to use for a communication. However, in such examples, transmission of multiple DCIs to the UE is inefficient and may increase control communication overhead on the wireless communication system as well as increase the UE's control monitoring overhead.

SUMMARY

In some aspects, a method of wireless communication, performed by a user equipment (UE), may include receiving single downlink control information (DCI) that indicates resources for a plurality of transmission configuration indicator (TCI) states for transmitting or receiving communications in a plurality of transmission time intervals (TTIs). The method may include transmitting or receiving the communications in the plurality of TTIs in accordance with the DCI.

In some aspects, a method of wireless communication, performed by a base station, may include determining, for a UE, resources for a plurality of TCI states for transmitting or receiving communications in a plurality of TTIs. The method may include transmitting, to the UE, single DCI that indicates the resources for the plurality of TCI states.

In some aspects, a UE for wireless communication may include memory and one or more processors operatively coupled to the memory. The memory and the one or more processors may be configured to receive single DCI that indicates resources for a plurality of TCI states for transmitting or receiving communications in a plurality of TTIs. The memory and the one or more processors may be configured to transmit or receive the communications in the plurality of TTIs in accordance with the DCI.

In some aspects, a base station for wireless communication may include memory and one or more processors operatively coupled to the memory. The memory and the one or more processors may be configured to determine, for a UE, resources for a plurality of TCI states for transmitting or receiving communications in a plurality of TTIs. The memory and the one or more processors may be configured to transmit, to the UE, single DCI that indicates the resources for the plurality of TCI states.

In some aspects, a non-transitory computer-readable medium may store one or more instructions for wireless communication. The one or more instructions, when executed by one or more processors of a UE, may cause the one or more processors to receive single DCI that indicates resources for a plurality of TCI states for transmitting or receiving communications in a plurality of TTIs. The one or more instructions, when executed by one or more processors of the UE, may cause the one or more processors to transmit or receive the communications in the plurality of TTIs in accordance with the DCI.

In some aspects, a non-transitory computer-readable medium may store one or more instructions for wireless communication. The one or more instructions, when executed by one or more processors of a base station, may cause the one or more processors to determine, for a UE, resources for a plurality of TCI states for transmitting or receiving communications in a plurality of TTIs. The one or more instructions, when executed by one or more processors of the base station, may cause the one or more processors to transmit, to the UE, single DCI that indicates the resources for the plurality of TCI states.

In some aspects, an apparatus for wireless communication may include means for receiving single DCI that indicates resources for a plurality of TCI states for transmitting or receiving communications in a plurality of TTIs. The apparatus may include means for transmitting or receiving the communications in the plurality of TTIs in accordance with the DCI.

In some aspects, an apparatus for wireless communication may include means for determining, for a UE, resources for a plurality of TCI states for transmitting or receiving communications in a plurality of TTIs. The apparatus may include means for transmitting, to the UE, single DCI that indicates the resources for the plurality of TCI states.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 8A-8H are diagrams illustrating examples of scheduling resources for multiple TCI states in multiple TTIs using single DCI in accordance with various aspects of the present disclosure.

DETAILED DESCRIPTION

Figure 1:
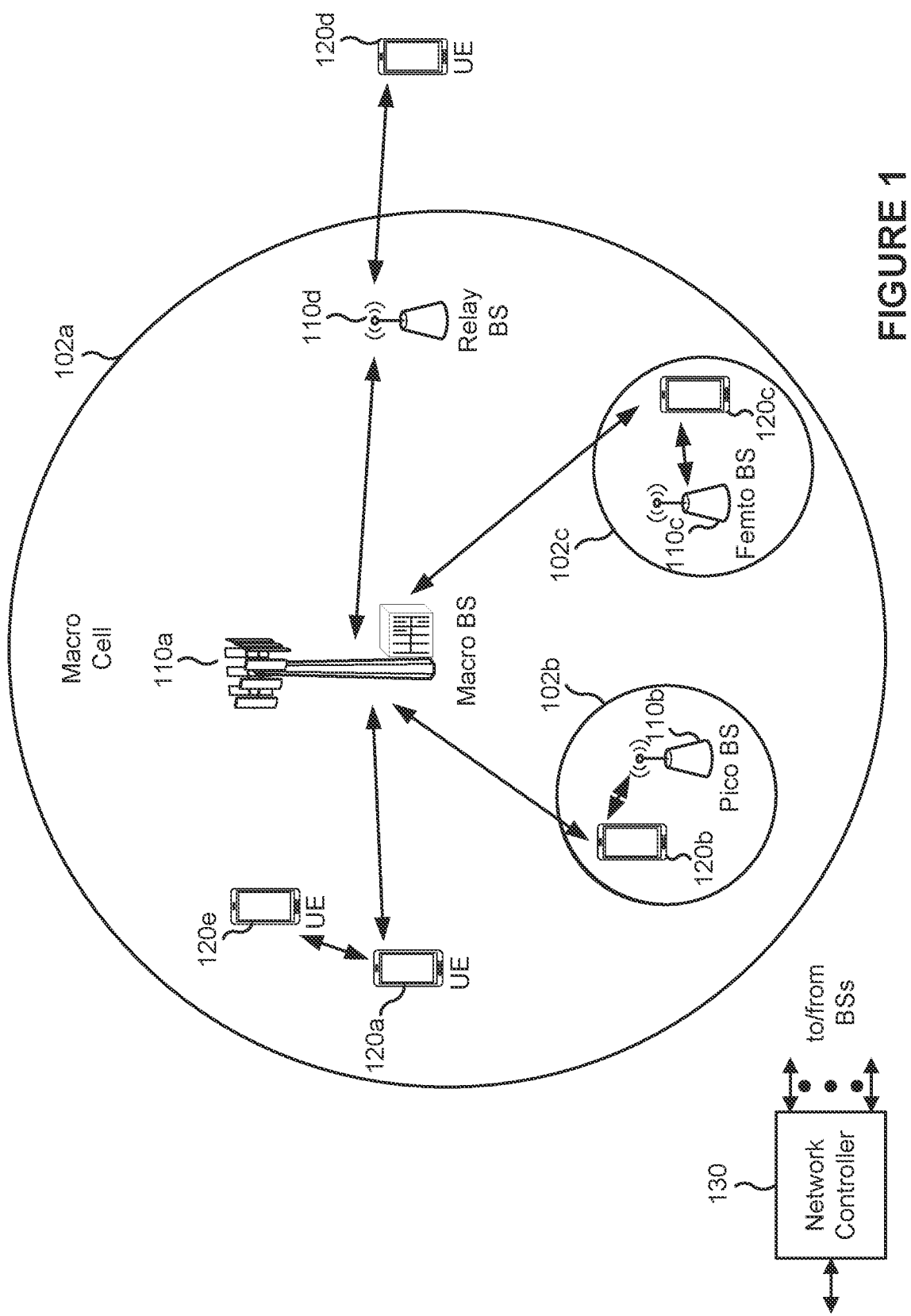
FIG. 1 is a diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In some wireless communication systems, communications associated with a user equipment (UE) may be scheduled in multiple transmission time intervals (TTIs) by respective separate downlink control information (DCI). Moreover, in some examples, each DCI may indicate a respective transmission configuration indicator (TCI) state associated with a beam that the UE is to use for a communication. For example, first DCI may schedule a first communication in a first TTI using a first beam, second DCI may schedule a second communication in a second TTI using a second beam, and so forth. However, in such examples, transmission of multiple DCIs to the UE is inefficient and may increase control communication overhead on the wireless communication system as well as increase the UE's control monitoring overhead.

Various aspects relate generally to the efficient scheduling of resources for multiple TCIs in multiple TTIs. Some aspects more specifically relate to the use of single DCI to indicate resources, or other control information, for multiple TCI states for transmitting or receiving communications in the multiple TTIs. In some aspects, a time domain resource assignment or a frequency domain resource assignment of the resources may be common to one or more of the multiple TCI states. For example, the single DCI may indicate a set of common resources or control information that are to be shared by the multiple TCI states, and may indicate respective sets of resources or control information for each TCI state that are not common to the TCI states. In some aspects, the resources or control information indicated by the single DCI are based at least in part on whether a UE is enabled to concurrently communicate using multiple TCI states.

Particular aspects of the subject matter described in this disclosure can be implemented to realize one or more of the following potential advantages. In some examples, the described techniques can be used to schedule multiple TTIs (for example, slots) using single DCI to thereby reduce control communication overhead as well as decrease control monitoring overhead. Accordingly, use of the single DCI may provide efficient signaling of resource assignments in the multiple TTIs, thereby enabling efficient operation in higher-frequency bands that use a higher subcarrier spacing and smaller slot and symbol durations. Moreover, use of the single DCI may provide efficient signaling of multiple TCI states to a UE capable of processing multiple TCI states simultaneously (for example, a UE equipped with multiple antenna panels, or a UE that is to receive non-coherent joint transmissions from multiple transmit receive points (TRPs)).

FIG. 1 is a diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110*a*, BS 110*b*, BS 110*c*, and BS 110*d*) and other network entities. A BS is an entity that communicates with UE(s) and may also be referred to as a Node B, an eNodeB, an eNB, a gNB, a NR BS, a 5G node B (NB), an access point (AP), or a TRP, among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some examples, a cell may not be stationary, rather, the geographic area of the cell may move in accordance with the location of a mobile BS. In some examples, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay base station 110*d* may communicate with macro BS 110*a* and a UE 120*d* in order to facilitate communication between BS 110*a* and UE 120*d*. A relay base station may also be referred to as a relay BS, a relay station, or a relay, among other examples, or combinations thereof.

UEs 120 (for example, 120*a*, 120*b*, 120*c*) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
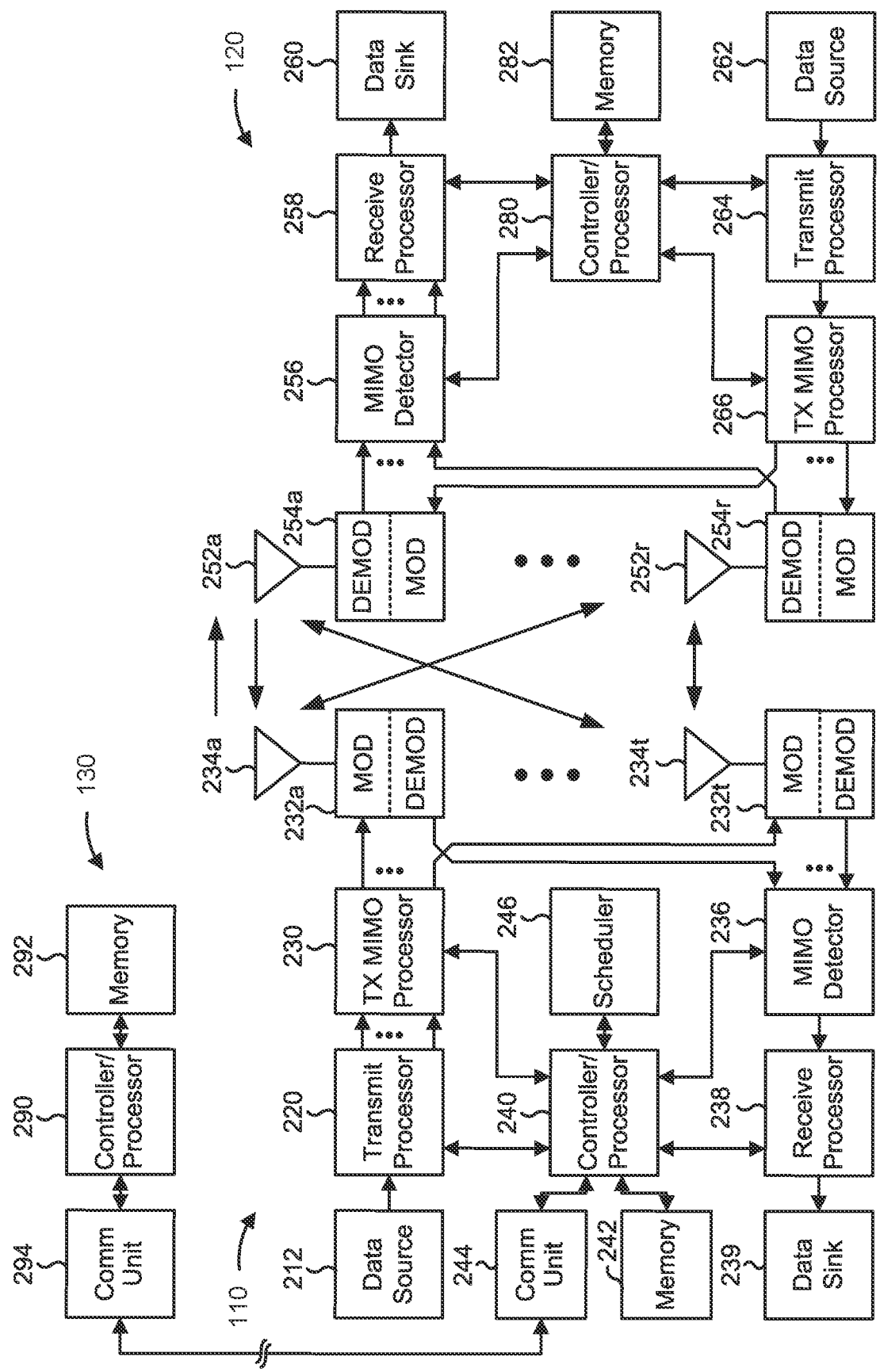
FIG. 2 is a diagram illustrating an example base station (BS) in communication with a user equipment (UE) in a wireless network in accordance with various aspects of the present disclosure.

FIG. 2 is a diagram illustrating an example BS in communication with a UE in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some examples, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with scheduling resources for multiple TCI states in multiple TTIs using single DCI, as described in more detail elsewhere herein. For example, controller/processor 240 of base station 110, controller/processor 280 of UE 120, or any other component(s) of FIG. 2 may perform or direct operations of, for example, process 900 of FIG. 9, process 1000 of FIG. 10, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving single DCI that indicates resources for a plurality of TCI states for transmitting or receiving communications in a plurality of TTIs, means for transmitting or receiving the communications in the plurality of TTIs in accordance with the DCI, among other examples, or combinations thereof. In some aspects, such means may include one or more components of UE 120 described in connection with FIG. 2.

In some aspects, base station 110 may include means for determining, for a UE, resources for a plurality of TCI states for transmitting or receiving communications in a plurality of TTIs, means for transmitting, to the UE, single DCI that indicates the resources for the plurality of TCI states, among other examples, or combinations thereof. In some aspects, such means may include one or more components of base station 110 described in connection with FIG. 2.

Figure 3A:
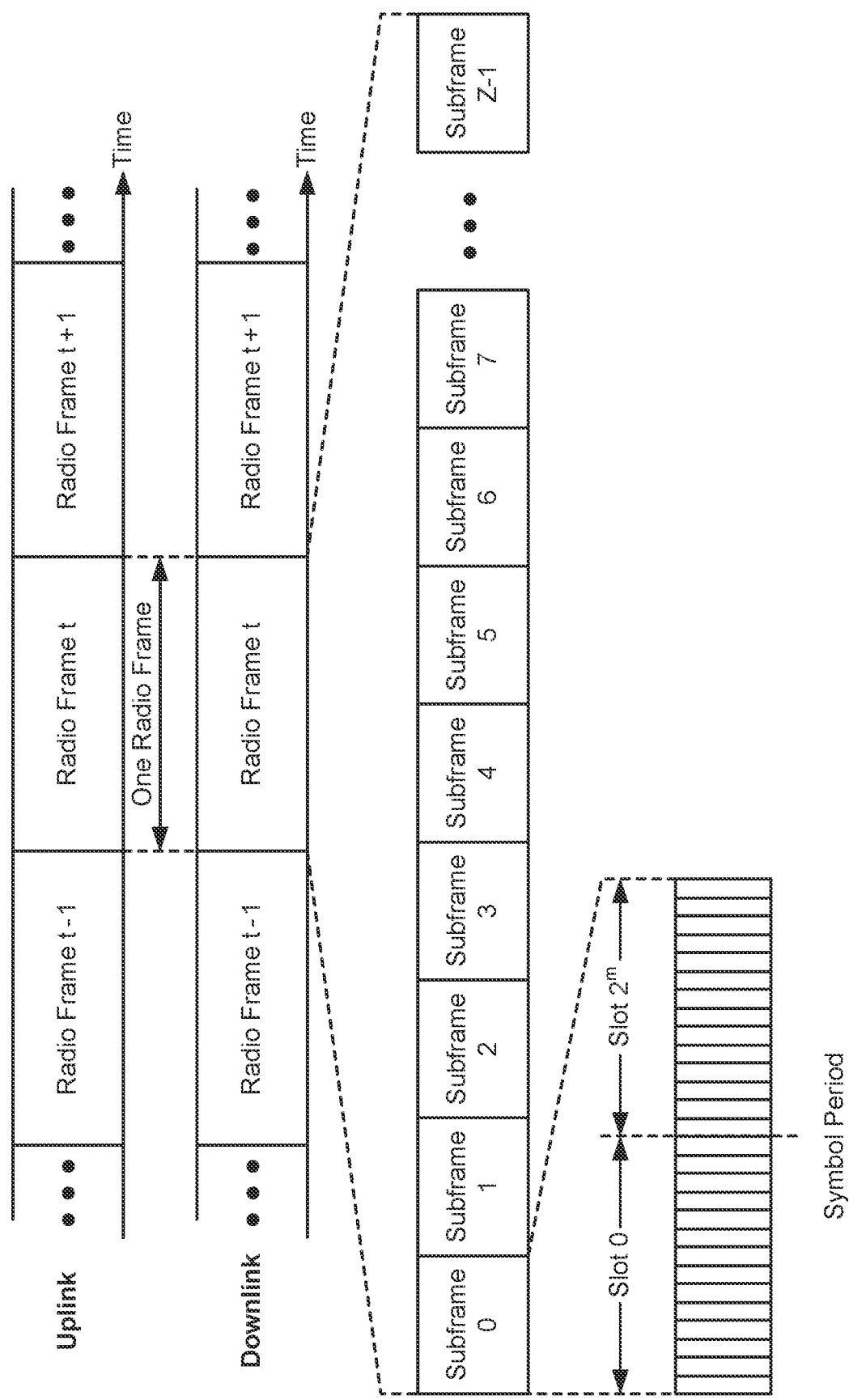
FIG. 3A is a diagram illustrating an example frame structure for use in a wireless network in accordance with various aspects of the present disclosure.

FIG. 3A is a diagram illustrating an example frame structure for use in a wireless network in accordance with various aspects of the present disclosure. For example, the frame structure may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, among other examples, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some examples, a scheduling unit for the FDD may be frame-based, subframe-based, slot-based, or symbol-based, among other examples, or combinations thereof.

While some techniques are described herein in connection with frames, subframes, or slots, among other examples, or combinations thereof, these techniques may equally apply to other types of wireless communication structures, which may be referred to using terms other than "frame," "subframe," "slot," among other examples, or combinations thereof in 5G NR. In some examples, "wireless communication structure" may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), among other examples, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some examples, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
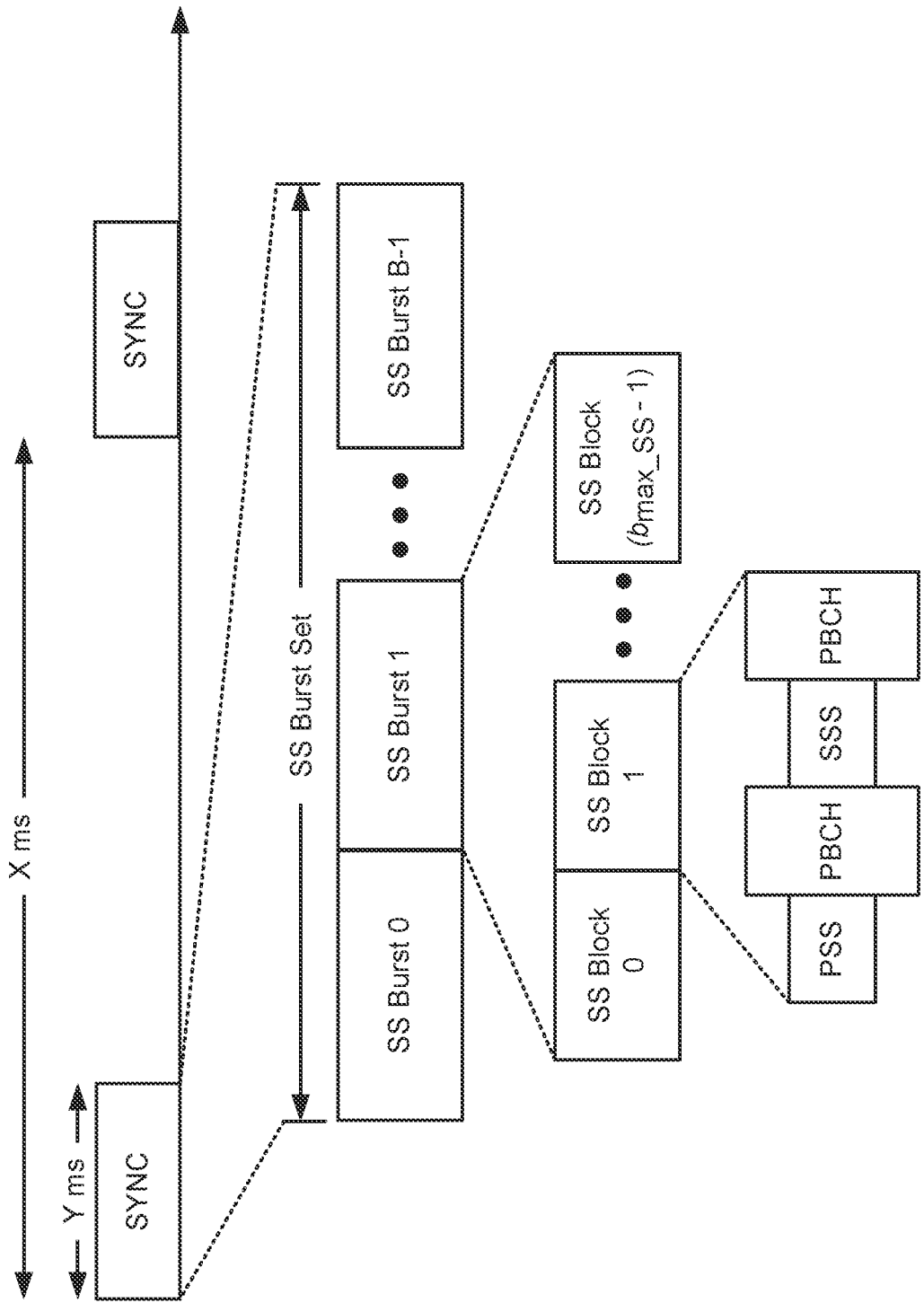
FIG. 3B is a diagram illustrating an example synchronization communication hierarchy for use in a wireless communication network in accordance with various aspects of the present disclosure.

FIG. 3B is a diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum quantity of SS blocks that can be carried by an SS burst). In some examples, different SS blocks may be beam-formed differently. An SS burst set may be periodically transmitted by a wireless node, such as every X milliseconds, as shown in FIG. 3B. In some examples, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some examples, an SS block includes resources that carry the PSS, the SSS, the PBCH, or other synchronization signals (for example, a tertiary synchronization signal (TSS)) or synchronization channels. In some examples, multiple SS blocks are included in an SS burst, and the PSS, the SSS, or the PBCH may be the same across each SS block of the SS burst. In some examples, a single SS block may be included in an SS burst. In some examples, the SS block may be at least four symbol periods in length, where each symbol carries one or more of the PSS (for example, occupying one symbol), the SSS (for example, occupying one symbol), or the PBCH (for example, occupying two symbols).

In some examples, the symbols of an SS block are consecutive, as shown in FIG. 3B. In some examples, the symbols of an SS block are non-consecutive. Similarly, in some examples, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some examples, the SS bursts may have a burst period during which the SS blocks of the SS burst are transmitted by the base station in accordance with the burst period. In other words, the SS blocks may be repeated during each SS burst. In some examples, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBs) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
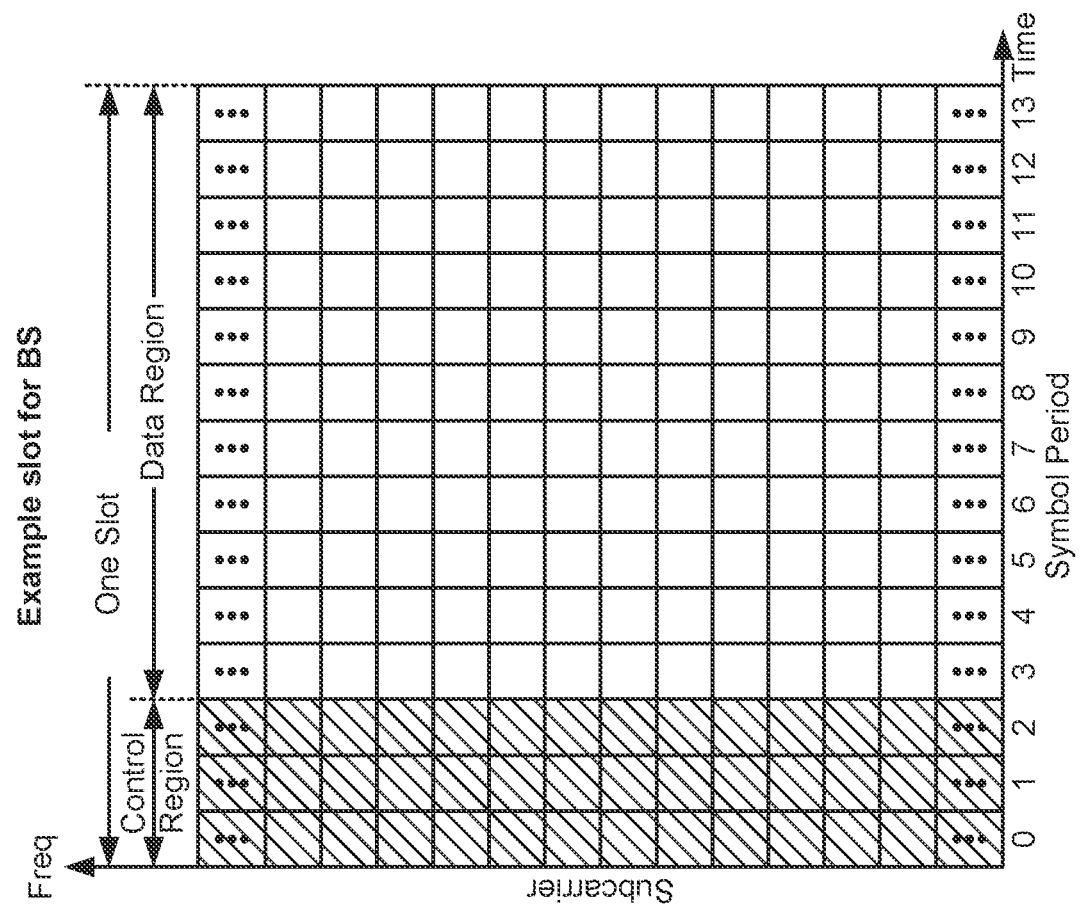
FIG. 4 is a diagram illustrating an example slot format in accordance with various aspects of the present disclosure.

FIG. 4 is a diagram illustrating an example slot format in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . Q−1}.

A UE may be located within the coverage of multiple BSs. One of these BSs may be selected to serve the UE. The serving BS may be selected based at least in part on various criteria such as received signal strength, received signal quality, or path loss, among other examples, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In some examples, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In some examples, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some examples, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
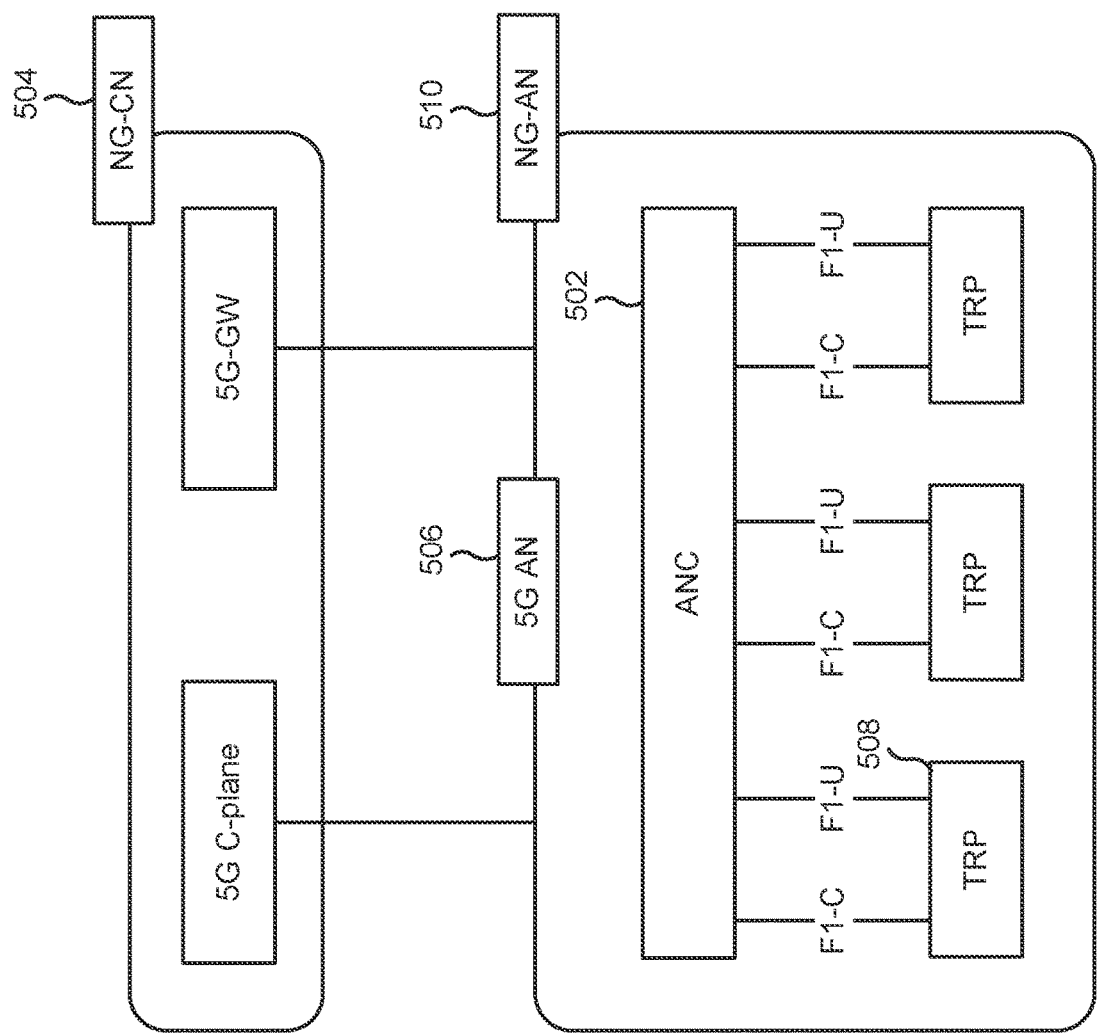
FIG. 5 is a diagram illustrating an example logical architecture of a distributed radio access network (RAN) in accordance with various aspects of the present disclosure.

FIG. 5 is a diagram illustrating an example logical architecture of a distributed radio access network (RAN) in accordance with various aspects of the present disclosure. A 5G access node 506 may include an access node controller (ANC) 502. The ANC may be a central unit (CU) of the distributed RAN. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of the RAN may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some examples, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In some examples, no inter-TRP interface may be needed/present.

In some examples, a dynamic configuration of split logical functions may be present within the architecture of the RAN. The packet data convergence protocol (PDCP), radio link control (RLC), and MAC protocol layers may be adaptably placed at the ANC or TRP.

Figure 6:
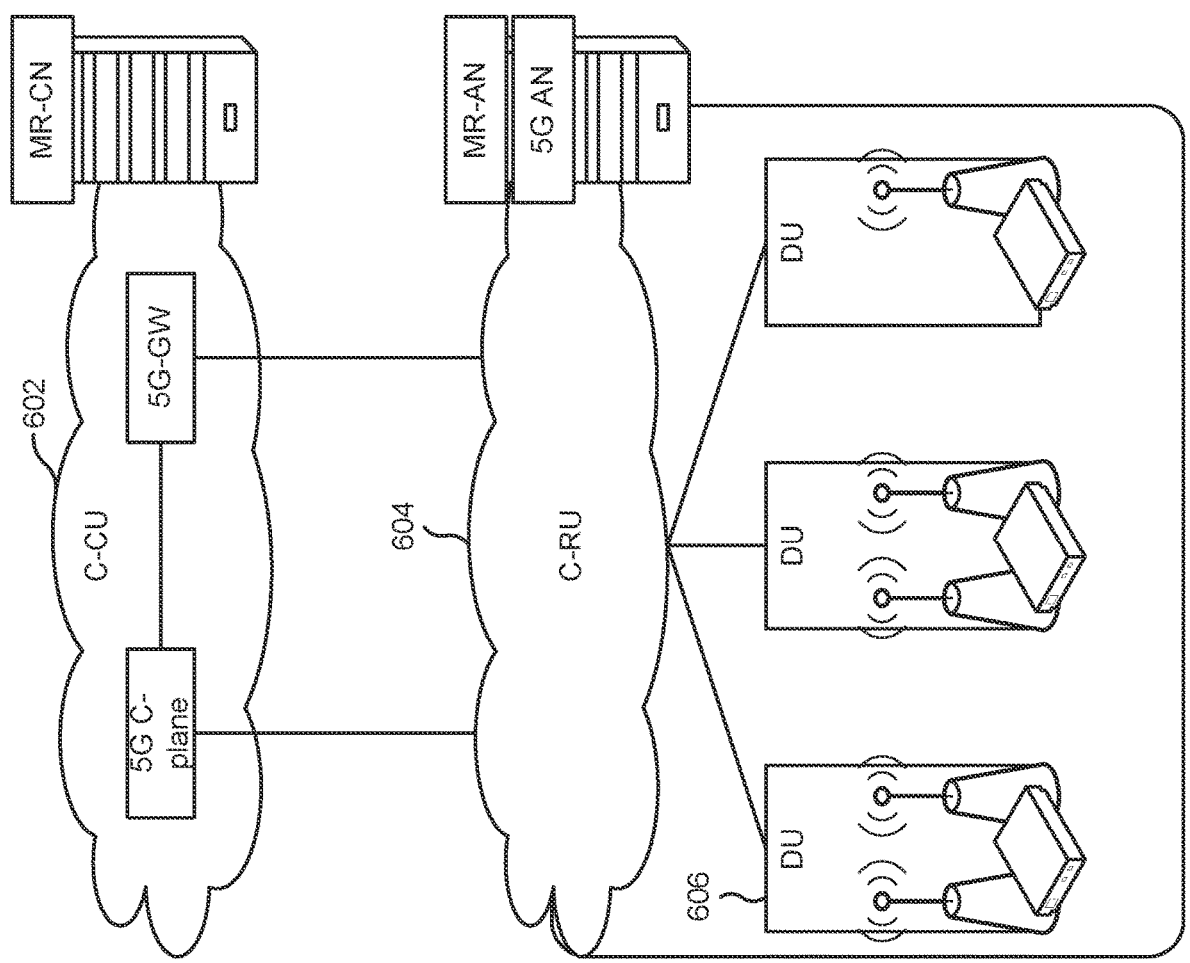
FIG. 6 is a diagram illustrating an example physical architecture of a distributed RAN in accordance with various aspects of the present disclosure.

FIG. 6 is a diagram illustrating an example physical architecture of a distributed RAN in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

In some wireless communication systems, communications associated with a UE may be scheduled in multiple TTIs by respective separate DCI. Moreover, in some examples, each DCI may indicate a respective TCI state associated with a beam that the UE is to use for a communication. For example, first DCI may schedule a first communication in a first TTI using a first beam, second DCI may schedule a second communication in a second TTI using a second beam, and so forth. However, in such examples, transmission of multiple DCIs to the UE is inefficient and may increase control communication overhead on the wireless communication system as well as increase the UE's control monitoring overhead.

Various aspects relate generally to the efficient scheduling of resources for multiple TCIs in multiple TTIs. Some aspects more specifically relate to the use of single DCI to indicate resources, or other control information, for multiple TCI states for transmitting or receiving communications in the multiple TTIs. In some aspects, a time domain resource assignment or a frequency domain resource assignment of the resources may be common to one or more of the multiple TCI states. For example, the single DCI may indicate a set of common resources or control information that are to be shared by the multiple TCI states, and may indicate respective sets of resources or control information for each TCI state that are not common to the TCI states. In some aspects, the resources or control information indicated by the single DCI are based at least in part on whether a UE is enabled to concurrently communicate using multiple TCI states.

Particular aspects of the subject matter described in this disclosure can be implemented to realize one or more of the following potential advantages. In some examples, the described techniques can be used to schedule multiple TTIs (for example, slots) using single DCI to thereby reduce control communication overhead as well as decrease control monitoring overhead. Accordingly, use of the single DCI may provide efficient signaling of resource assignments in the multiple TTIs, thereby enabling efficient operation in higher-frequency bands that use a higher subcarrier spacing and smaller slot and symbol durations. Moreover, use of the single DCI may provide efficient signaling of multiple TCI states to a UE capable of processing multiple TCI states simultaneously (for example, a UE equipped with multiple antenna panels, or a UE that is to receive non-coherent joint transmissions from multiple TRPs).

Figure 7:
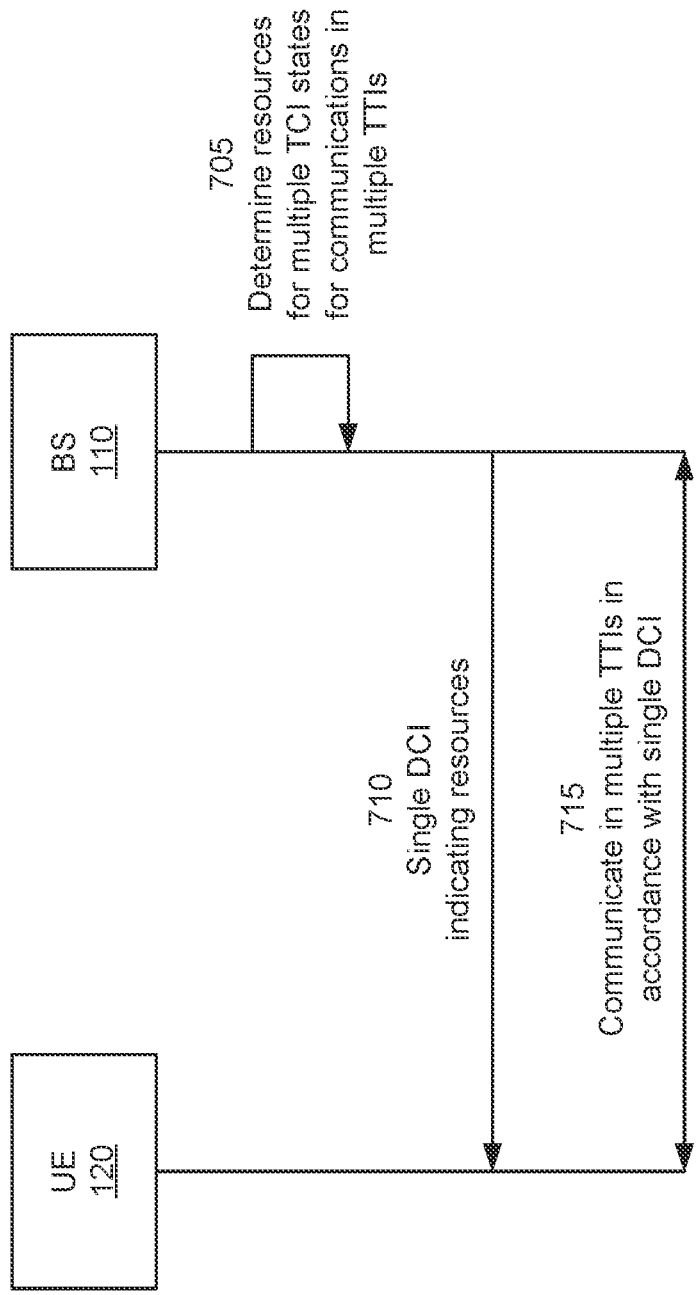
FIG. 7 is a diagram illustrating an example of scheduling resources for multiple transmission configuration indicator (TCI) states in multiple transmission time intervals (TTIs) using single downlink control information (DCI) in accordance with various aspects of the present disclosure.

FIG. 7 is a diagram illustrating an example of scheduling resources for multiple TCI states in multiple TTIs using single DCI in accordance with various aspects of the present disclosure. As shown in FIG. 7, a UE 120 may communicate with a BS 110 in connection with scheduling a downlink transmission or an uplink transmission. In some aspects, UE 120 may be enabled to concurrently communicate using multiple TCI states (that is, using multiple beams). In some other aspects, UE 120 may not be enabled to concurrently communicate using multiple TCI states. Accordingly, UE 120 may transmit to BS 110 information indicating whether UE 120 is enabled to concurrently communicate using multiple TCI states.

In a first operation 705, BS 110 may determine resources for multiple TCI states that are to be used by UE 120 for transmitting or receiving communications in multiple TTIs. In some aspects, a TTI may be a slot, a mini-slot, among other examples. In some aspects, each communication may be associated with a respective TCI state of the multiple TCI states. For example, a first communication may be associated with a first TCI state, and a second communication may be associated with a second TCI state. In some aspects, the first communication may include a first set of redundancy versions of a transport block, and the second communication may include a second set of redundancy versions of the transport block. In some other aspects, the first communication may include a first transport block, and the second communication may include a second transport block (for example, with the same modulation and coding schemes).

The resources may be physical uplink shared channel (PUSCH) resources (for example, in an example in which UE 120 is transmitting the communications) or may be PDSCH resources (for example, in an example in which UE 120 is receiving the communications). In some aspects, the resources may have one or more time domain resource assignments or one or more frequency domain resource assignments that are the same for the multiple TCI states, or the resources may have one or more time domain resource assignments or one or more frequency domain resource assignments that are different for the multiple TCI states. BS 110 may determine the time domain resource assignments and the frequency domain resource assignments of the resources as described in FIGS. 8A-8H.

In some aspects, BS 110 also may determine control information for the multiple TCI states that are to be used by UE 120 for transmitting or receiving the communications in the multiple TTIs. For example, BS 110 may determine redundancy versions of one or more transport blocks that are to be transmitted or received in the resources. As another example, BS 110 may determine one or more timing values (for example, K0 values or K2 values) for transmitting or receiving the communications in the resources. As a further example, BS 110 may determine one or more start and length indicator values (SLIVs) for transmitting or receiving the communications in the resources. As an additional example, BS 110 may determine one or more hybrid automatic repeat request (HARD) process identifiers for the communications.

In a second operation 710, BS 110 may transmit, and UE 120 may receive, single DCI that indicates the resources determined by BS 110 for the communications. That is, the single DCI may indicate the resources for multiple TCI states that are to be used by UE 120 for transmitting or receiving the communications in the multiple TTIs. In addition, the single DCI may indicate the control information determined by BS 110 for the communications.

In some aspects, the single DCI may indicate a respective set of the resources that are to be used for each TCI state. In some aspects, the single DCI may indicate a respective pattern (for example, a frequency hopping pattern) for determining the resources that are to be used for each TCI state. In some aspects, the single DCI may indicate a set of common resources or control information that are to be shared by the multiple TCI states, and may indicate a respective set of the resources or the control information for each TCI state that are not common to the TCI states.

In some aspects, such as in an example in which the communications are to be transmitted or received on multiple component carriers, the single DCI may indicate the resources or control information for a first component carrier. In such examples, UE 120 may determine the resources or control information for a second component carrier based at least in part on the resources or control information for the first component carrier. For example, the resources or the control information for the second component carrier may be the same as the resources or the control information for the first component carrier. As another example, the resources for the second component carrier may be scaled relative to the resources for the first component carrier in accordance with a difference between subcarrier spacings of the first and second component carriers.

In a third operation 715, BS 110 and UE 120 may communicate, over the multiple TTIs, in accordance with the single DCI. That is, UE 120 may transmit or receive the communications, over the multiple TTIs, in the resources indicated by the single DCI and using the multiple TCI states. For example, based on the multiple TCI states indicated by the DCI, each being associated with a respective communication, UE 120 may determine respective beams that are to be used to transmit or receive the communications. Accordingly, UE 120 may use the respective beams to transmit or receive (for example, orthogonally or simultaneously) the communications over the multiple TTIs in the resources indicated by the single DCI. In this way, the single DCI may reduce a quantity of control communications that are transmitted from BS 110 to UE 120 as well as reduce control monitoring performed by UE 120.

FIGS. 8A-8H are diagrams illustrating examples of scheduling resources for multiple TCI states in multiple TTIs using single DCI in accordance with various aspects of the present disclosure. FIGS. 8A-8H show example time domain resource assignments and frequency domain resource assignments of the resources that may be indicated by the single DCI. For example, BS 110 may determine the time domain resource assignments and frequency domain resource assignments of the resources as shown in FIGS. 8A-8H. Similarly, UE 120 may transmit or receive the communications in the resources having time domain resource assignments and frequency domain resource assignments as shown in FIGS. 8A-8H.

As shown in FIGS. 8A-8H, a first communication (Communication 1) may be associated with a first TCI state (TCI-1) and a second communication (Communication 2) may be associated with a second TCI state (TCI-2). That is, the single DCI may indicate that the first communication (Communication 1) is to be transmitted or received by UE 120 using the first TCI state (TCI-1), and the second communication (Communication 2) is to be transmitted or received by UE 120 using the second TCI state (TCI-2).

Figure 8A:
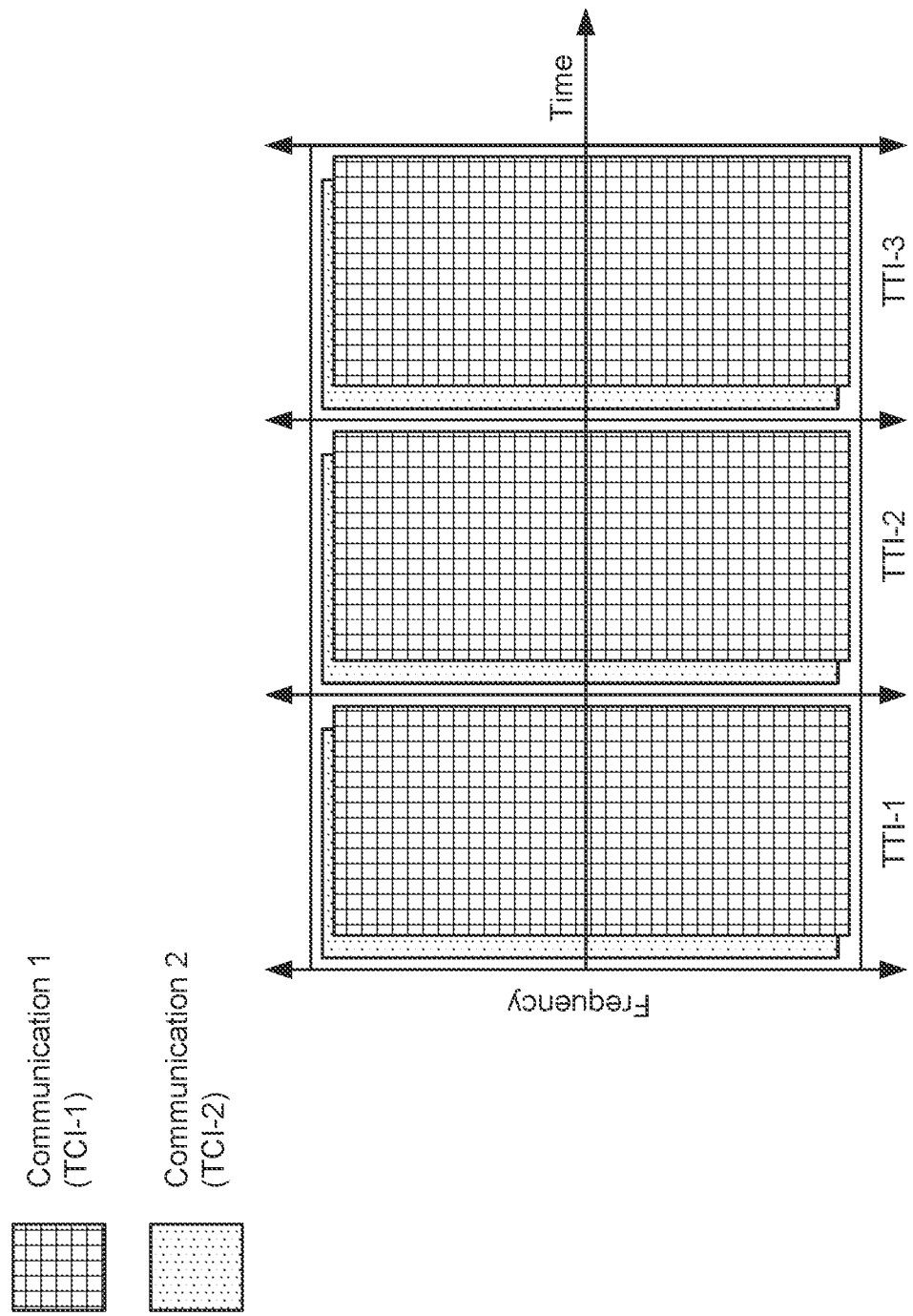

As shown in FIG. 8A, BS 110 may determine the resources so as to enable spatial division multiplexing (SDM) of the communications over multiple TTIs. For example, time domain resource assignments of the resources for the first TCI state (TCI-1) may be the same as time domain resource assignments of the resources for the second TCI state (TCI-2), and frequency domain resource assignments of the resources for the first TCI state (TCI-1) may overlap with frequency domain resource assignments of the resources for the second TCI state (TCI-2). In other words, the single DCI may indicate common time domain resource assignments and frequency domain resource assignments for the first TCI state (TCI-1) and the second TCI state (TCI-2).

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In addition, the resources for the first TCI state (TCI-1) and the second TCI state (TCI-2) may have frequency domain resource assignments that overlap in each of TTI-1, TTI-2, and TTI-3. In this way, UE 120 may transmit or receive the first communication (Communication 1) and the second communication (Communication 2) concurrently (for example, using multiple panels of UE 120) over multiple TTIs. For example, UE 120 may receive the first communication (Communication 1) and the second communication (Communication 2) concurrently from a single TRP or from multiple TRPs.

Figure 8B:
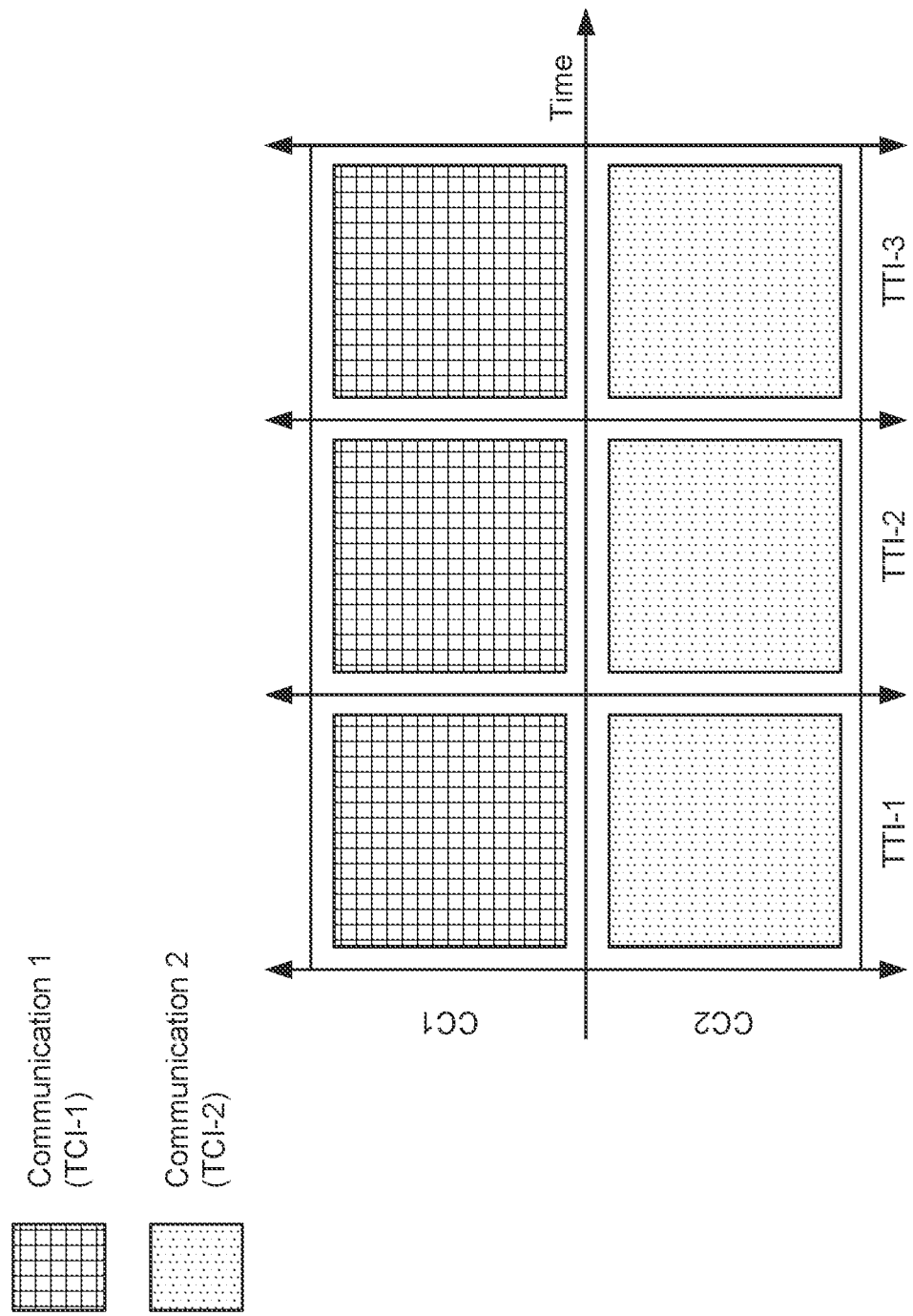

As shown in FIG. 8B, BS 110 may determine the resources so as to enable transmission or reception of the communications on multiple component carriers over multiple TTIs. For example, time domain resource assignments of the resources for the first TCI state (TCI-1) may be the same as time domain resources assignments of the resources for the second TCI state (TCI-2), and the first TCI state (TCI-1) may be associated with a first component carrier (CC1) and the second TCI state (TCI-2) may be associated with a second component carrier (CC2). In other words, the single DCI may indicate common time domain resource assignments for the first TCI state (TCI-1) and the second TCI state (TCI-2), and indicate different component carriers for the first TCI state (TCI-1) and the second TCI state (TCI-2).

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In addition, frequency domain resource assignments of the resources for the first TCI state (TCI-1) on the first component carrier (CC1) may be different than frequency domain resource assignments of the resources for the second TCI state (TCI-2) on the second component carrier (CC2) in each of TTI-1, TTI-2, and TTI-3. In this way, UE 120 may transmit or receive the first communication (Communication 1) and the second communication (Communication 2) on multiple component carriers over multiple TTIs.

As shown in FIG. 8C, BS 110 may determine the resources so as to enable transmission or reception of the communications on multiple component carriers over multiple TTIs. For example, time domain resource assignments of the resources for the first TCI state (TCI-1) may be the same as time domain resources assignments of the resources for the second TCI state (TCI-2), and frequency domain resource assignments of the resources for the first TCI state (TCI-1) may overlap with frequency domain resource assignments for the second TCI state (TCI-2) on the first component carrier (CC1) or the second component carrier (CC-2). That is, BS 110 may determine the resources so as to enable SDM of the communications on respective component carriers over multiple TTIs.

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In addition, frequency domain resource assignments of the resources for the first TCI state (TCI-1) on the first component carrier (CC1) may overlap with frequency domain resource assignments of the resources for the second TCI state (TCI-2) on the first component carrier (CC1) in each of TTI-1, TTI-2, and TTI-3. Moreover, frequency domain resource assignments of the resources for the first TCI state (TCI-1) on the second component carrier (CC2) may overlap with frequency domain resource assignments of the resources for the second TCI state (TCI-2) on the second component carrier (CC2) in each of TTI-1, TTI-2, and TTI-3. In this way, UE 120 may transmit or receive the first communication (Communication 1) and the second communication (Communication 2) on multiple component carriers over multiple TTIs. Moreover, UE 120 may transmit or receive the first communication (Communication 1) and the second communication (Communication 2) concurrently (for example, using multiple panels of UE 120) on multiple component carriers.

As shown in FIG. 8D, BS 110 may determine the resources so as to enable frequency division multiplexing (FDM) of the communications over multiple TTIs. For example, time domain resource assignments of the resources for the first TCI state (TCI-1) may be the same as time domain resources assignments of the resources for the second TCI state (TCI-2), and frequency domain resource assignments of the resources for the first TCI state (TCI-1) may not overlap with frequency domain resource assignments for the second TCI state (TCI-2). In other words, the single DCI may indicate common time domain resource assignments for the first TCI state (TCI-1) and the second TCI state (TCI-2), and may indicate different frequency domain resource assignments for the first TCI state (TCI-1) and the second TCI state (TCI-2).

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In addition, the resources for the first TCI state (TCI-1) and the second TCI state (TCI-2) may have frequency domain resource assignments that do not overlap in each of TTI-1, TTI-2, and TTI-3. In this way, UE 120 may transmit or receive the first communication (Communication 1) and the second communication (Communication 2) concurrently (for example, using multiple panels of UE 120) over multiple TTIs. For example, UE 120 may receive the first communication (Communication 1) and the second communication (Communication 2) concurrently from multiple TRPs.

Figure 8E:
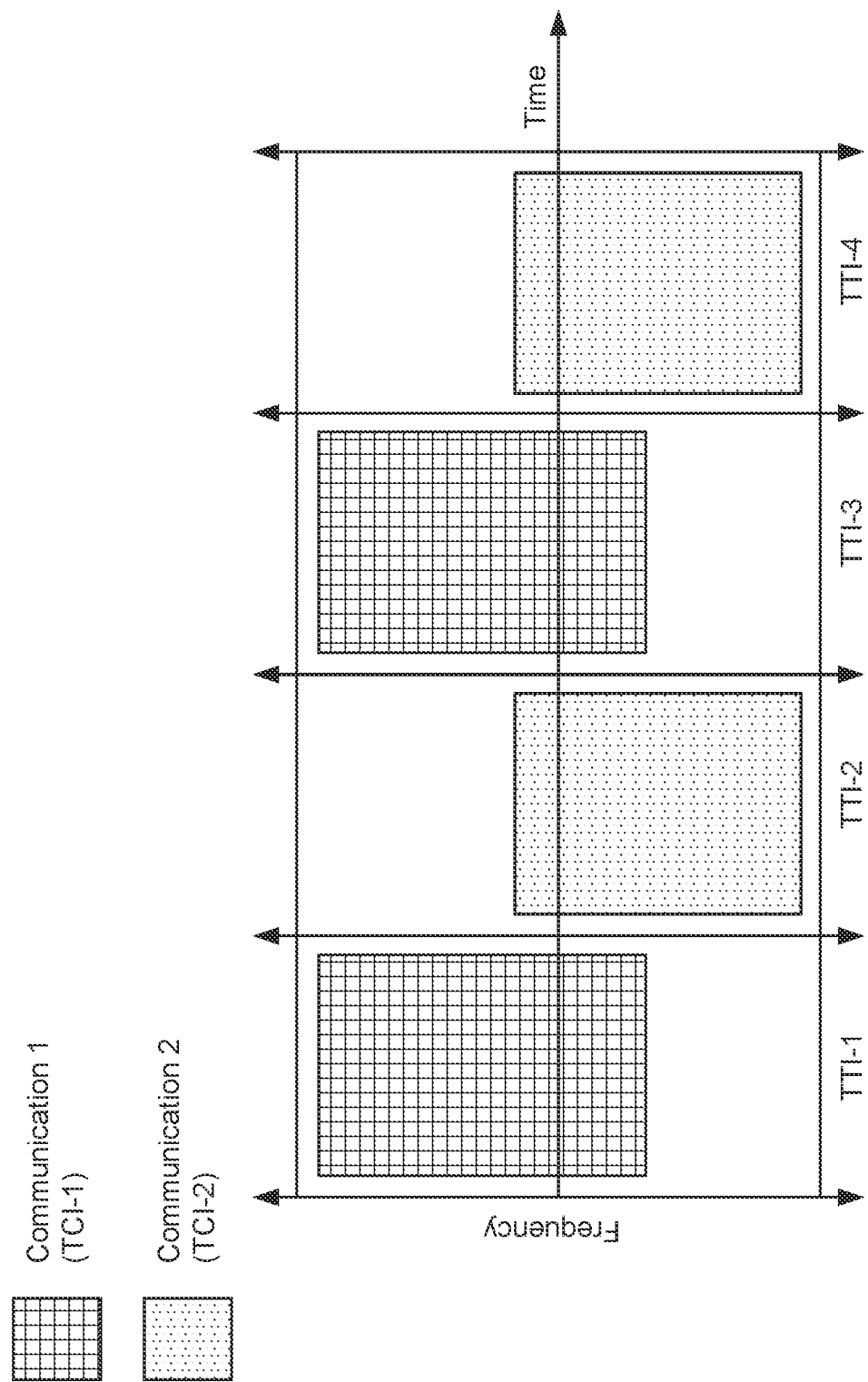

As shown in FIG. 8E, BS 110 may determine the resources so as to enable time division multiplexing (TDM) of the communications over multiple TTIs. For example, time domain resource assignments of the resources for the first TCI state (TCI-1) may be different than time domain resource assignments of the resources for the second TCI state (TCI-2), and frequency domain resource assignments of the resources for the first TCI state (TCI-1) may be different than frequency domain resource assignments for the second TCI state (TCI-2). In other words, the single DCI may indicate different time domain resource assignments and frequency domain resource assignments for the first TCI state (TCI-1) and the second TCI state (TCI-2).

In particular, the resources for the first TCI state (TCI-1) and the second TCI state (TCI-2) may have different time domain resource assignments over multiple TTIs. For example, the resources for the first TCI state (TCI-1) may have time domain resource assignments for TTI-1 and TTI-3, and the resources for the second TCI state (TCI-2) may have time domain resource assignments for TTI-2 and TTI-4. In addition, the frequency domain resource assignments of the resources for the first TCI state (TCI-1) in TTI-1 and TTI-3 may be different than the frequency domain resource assignments of the resources for the second TCI state (TCI-2) in TTI-2 and TTI-4. In this way, in an example in which UE 120 is not enabled to concurrently communicate using multiple TCI states, UE 120 may transmit or receive the first communication (Communication 1) and the second communication (Communication 2) over multiple TTIs. Accordingly, in some aspects, BS 110 may determine the resources based at least in part on a determination that UE 120 is not enabled to concurrently communicate using multiple TCI states.

Figure 8F:
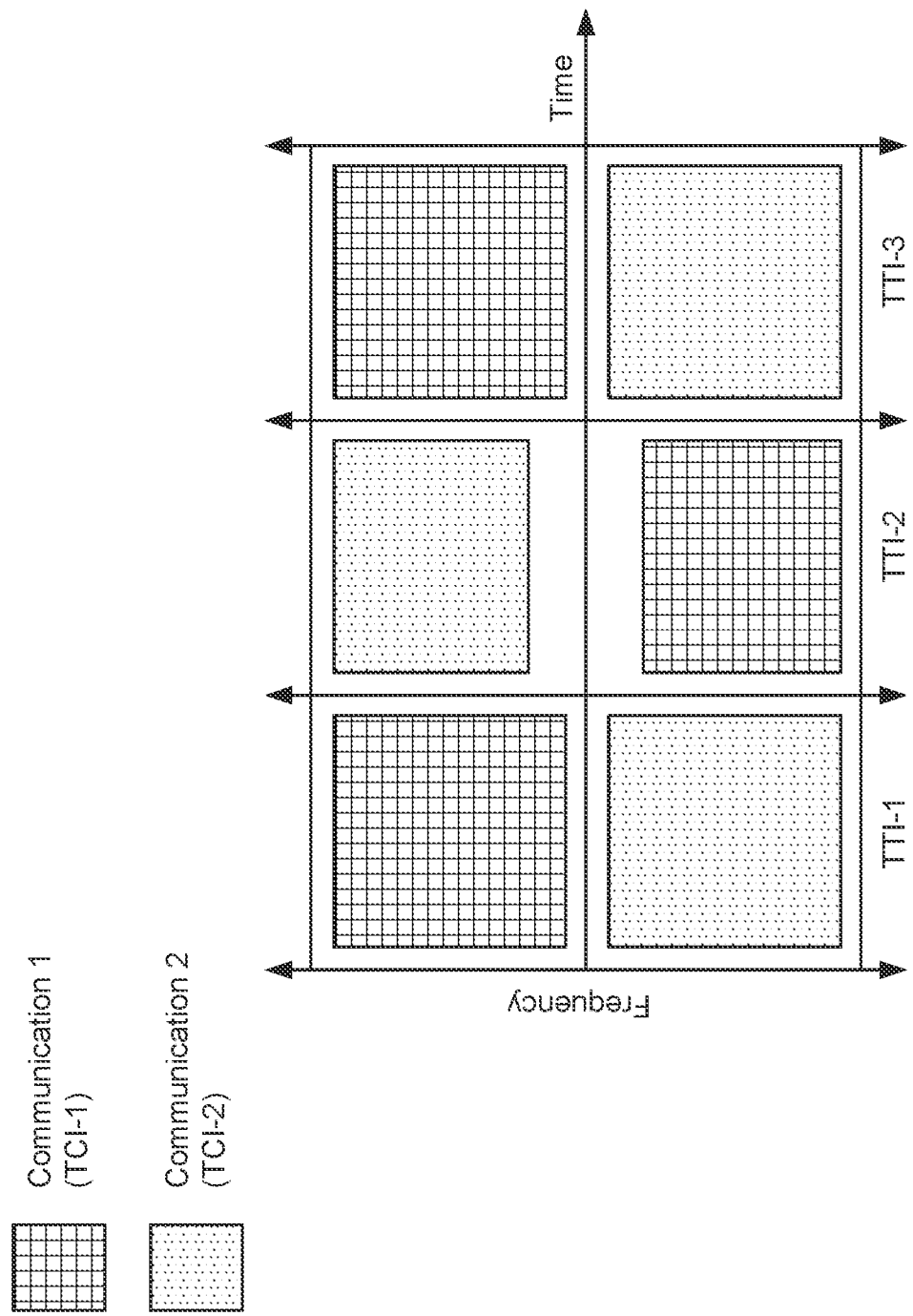

As shown in FIG. 8F, BS 110 may determine the resources so as to enable TDM of the communications with frequency hopping over multiple TTIs. For example, time domain resource assignments of the resources for the first TCI state (TCI-1) may be the same as time domain resource assignments of the resources for the second TCI state (TCI-2), and frequency domain resource assignments of the resources for the first TCI state (TCI-1) may be in accordance with a first frequency hopping pattern that is different than a second frequency hopping pattern for frequency domain resource assignments for the second TCI state (TCI-2). In other words, the single DCI may indicate common time domain resource assignments for the first TCI state (TCI-1) and the second TCI state (TCI-2), and may indicate different frequency hopping patterns for the first TCI state (TCI-1) and the second TCI state (TCI-2).

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In TTI-1, frequency domain resource assignments of the resources for the first TCI state (TCI-1) may be different than frequency domain resource assignments of the resources for the second TCI state (TCI-2). In TTI-2, frequency domain resource assignments of the resources for the first TCI state (TCI-1) and the resources for the second TCI state (TCI-2) may hop frequencies relative to TTI-1, and frequency domain resource assignments of the resources for the first TCI state (TCI-1) may be different than frequency domain resource assignments of the resources for the second TCI state (TCI-2). In TTI-3, frequency domain resource assignments of the resources for the first TCI state (TCI-1) and the resources for the second TCI state (TCI-2) may hop frequencies relative to TTI-2, and frequency domain resource assignments of the resources for the first TCI state (TCI-1) may be different than frequency domain resource assignments of the resources for the second TCI state (TCI-2). In this way, in an example in which UE 120 is enabled to concurrently communicate using multiple TCI states, UE 120 may transmit or receive the first communication (Communication 1) and the second communication (Communication 2) with frequency hopping over multiple TTIs.

Figure 8G:
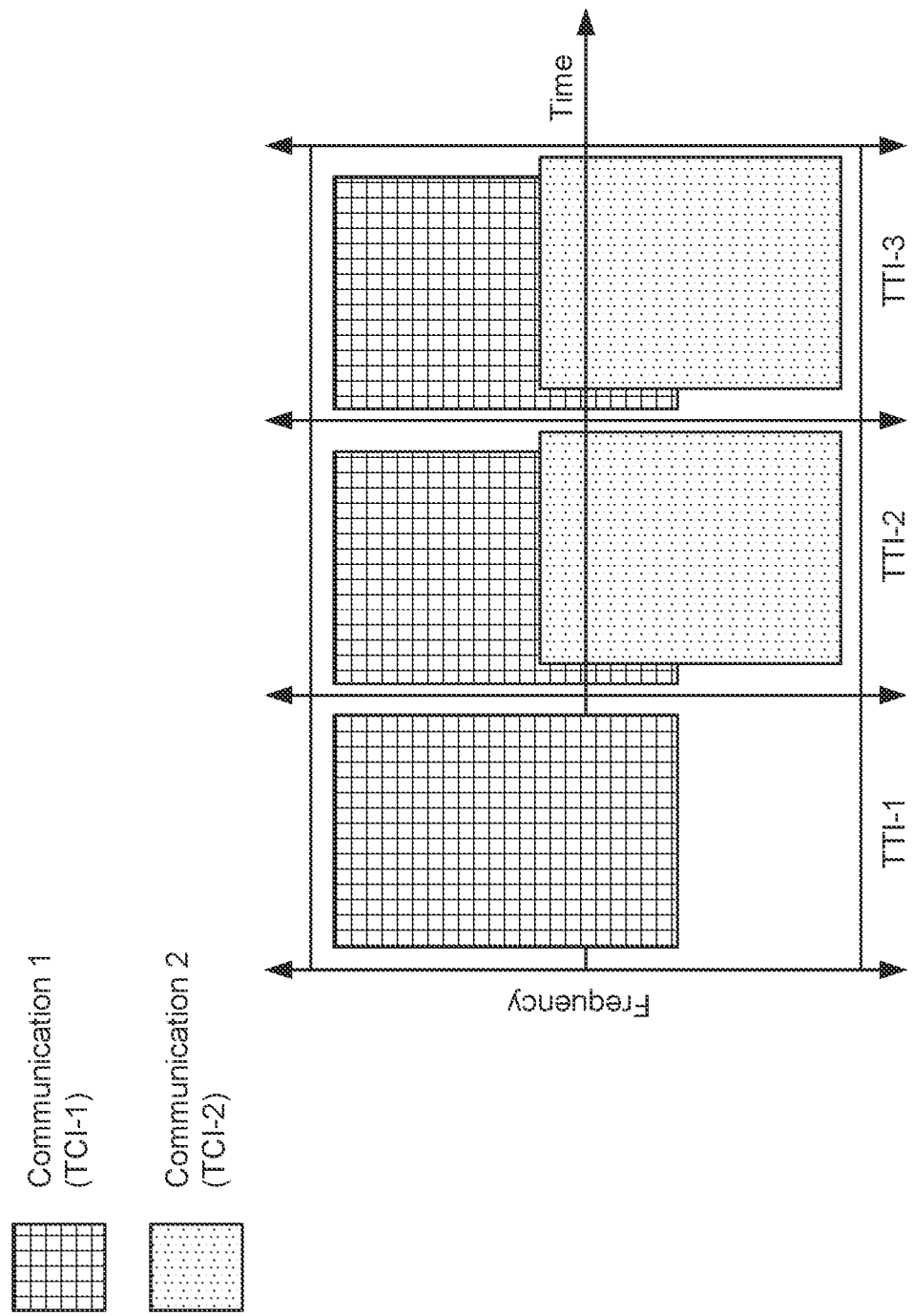

As shown in FIG. 8G, BS 110 may determine time domain resource assignments and frequency domain resource assignments of the resources for the first TCI state (TCI-1) and the second TCI state (TCI-2) that do not correspond to a particular SDM, FDM, TDM, or frequency hopping scheme (for example, TCI-1 and TCI-2 may have independent rectangular or non-rectangular frequency domain resource assignments). For example, time domain resource assignments of the resources for the first TCI state (TCI-1) may partially overlap with time domain resources assignments of the resources for the second TCI state (TCI-2), and frequency domain resource assignments of the resources for the first TCI state (TCI-1) may partially overlap with frequency domain resource assignments for the second TCI state (TCI-2). In other words, the single DCI may indicate different time domain resource assignments and frequency domain resources assignments for the first TCI state (TCI-1) and the second TCI state (TCI-2).

In particular, the time domain resource assignments of the resources for the first TCI state (TCI-1) and the second TCI state (TCI-2) may partially overlap over multiple TTIs. For example, the resources for the first TCI state (TCI-1) may have time domain resource assignments for TTI-1, TTI-2, and TTI-3, and the resources for the second TCI state (TCI-2) may have time domain resource assignments for TTI-2 and TTI-3. In addition, the frequency domain resource assignments of the resources for the first TCI state (TCI-1) in TTI-2 and TTI-3 (that is, the overlapping TTIs of TCI-1 and TCI-2) may partially overlap with the frequency domain resource assignments of the resources for the second TCI state (TCI-2) in TTI-2 and TTI-3. In this way, UE 120 may transmit or receive the first communication (Communication 1) and the second communication (Communication 2) concurrently (for example, using multiple panels of UE 120) over multiple TTIs. For example, UE 120 may receive the first communication (Communication 1) and the second communication (Communication 2) concurrently from multiple TRPs.

As shown in FIG. 8H, BS 110 may determine time domain resource assignments and frequency domain resource assignments of the resources for the first TCI state (TCI-1) and the second TCI state (TCI-2) that do not correspond to a particular SDM, FDM, TDM, or frequency hopping scheme (for example, TCI-1 and TCI-2 may have independent rectangular or non-rectangular frequency domain resource assignments). For example, the first communication (Communication 1) and the second communication (Communication 2) may correspond to respective transport blocks having different modulation and coding schemes, different time domain resource assignments, or different frequency domain resource assignments. As an example, the resources of the first TCI state (TCI-1) may be scheduled for a HARQ retransmission of the first communication (Communication 1) and the resources of the second TCI state (TCI-2) may be scheduled for a first transmission of the second communication (Communication 2).

In some aspects, as shown in FIG. 8H, the resources of the first TCI state (TCI-1) and the resources of the second TCI state (TCI-2) may be rate matched around a third communication (Communication 3). For example, time domain resource assignments of the resources for the first TCI state (TCI-1) may be the same as time domain resources assignments of the resources for the second TCI state (TCI-2), and frequency domain resource assignments of the resources for the first TCI state (TCI-1) and the resources for the second TCI state (TCI-2) may be rate matched around resources scheduled for another communication (Communication 3) in one or more TTIs.

In particular, the resources for the first TCI state (TCI-1) and the second TCI state (TCI-2) may have common time domain resource assignments that are the same over multiple TTIs. That is, the resources for the first TCI state (TCI-1) and the second TCI state (TCI-2) may have time domain resource assignments for TTI-1, TTI-2, and TTI-3. In addition, the resources for the first TCI state (TCI-1) and the second TCI state (TCI-2) may have frequency domain resource assignments that overlap in each of TTI-1, TTI-2, and TTI-3. Moreover, the resources for the first TCI state (TCI-1) and the second TCI state (TCI-2) may have frequency domain resource assignments that are rate matched around the third communication (Communication 3) in TTI-2. The third communication (Communication 3) may be a semi-persistent scheduling (SPS) communication, a synchronization signal block (SSB), a channel state information reference signal (CSI-RS), among other examples. In this way, UE 120 may transmit or receive the first communication (Communication 1) and the second communication (Communication 2) concurrently (for example, using multiple panels of UE 120) over multiple TTIs as well as transmit or receive the third communication (Communication 3) in accordance with other scheduling.

Figure 9:
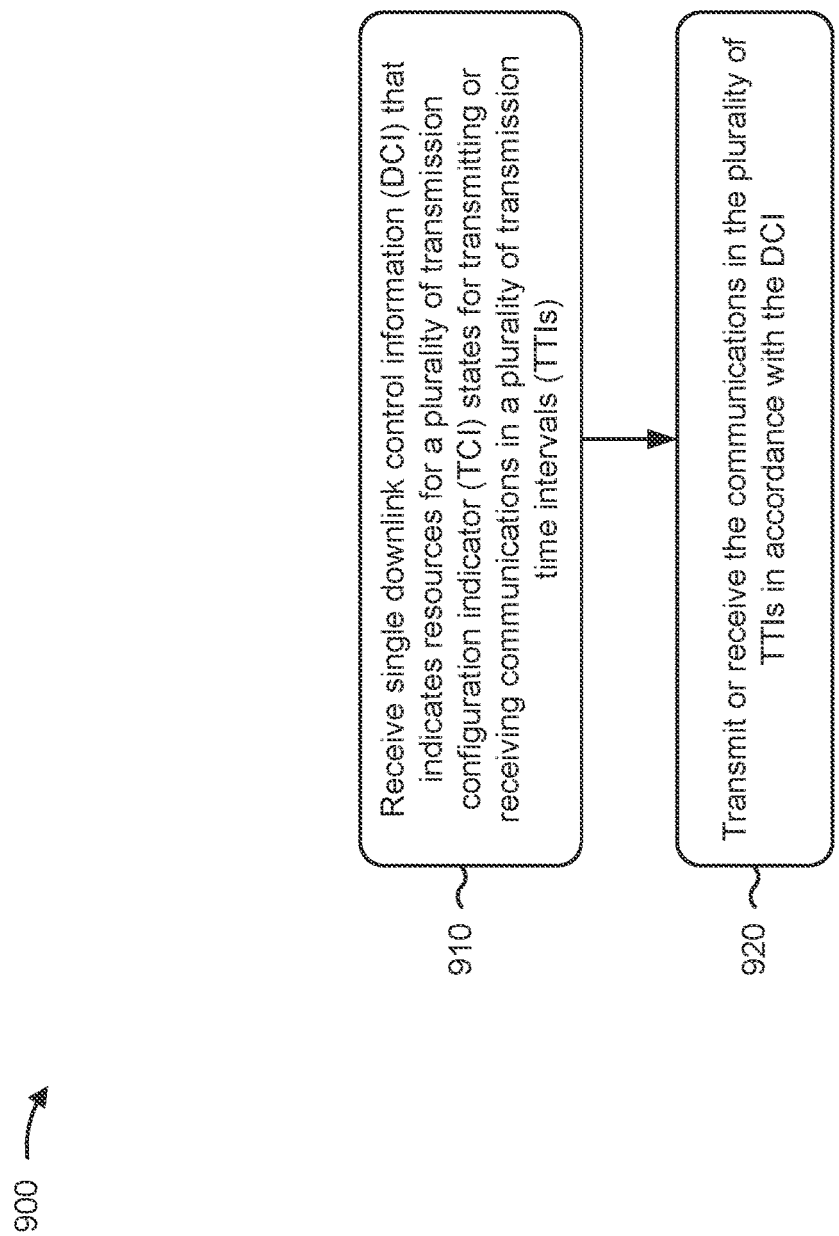
FIG. 9 is a flowchart illustrating an example process performed by a UE in accordance with various aspects of the present disclosure.

FIG. 9 is a diagram illustrating an example process 900 performed, for example, by a UE, in accordance with various aspects of the present disclosure. Example process 900 is an example where a UE, such as UE 120, performs operations associated with scheduling resources for multiple TCI states in multiple TTIs using single DCI.

As shown in FIG. 9, in some aspects, process 900 may include receiving single DCI that indicates resources for a plurality of TCI states for transmitting or receiving communications in a plurality of TTIs (block 910). For example, the UE (using antenna 252, DEMOD 254, MIMO detector 256, receive processor 258, controller/processor 280, among other examples) may receive single DCI that indicates resources for a plurality of TCI states for transmitting or receiving communications in a plurality of TTIs, as described above.

As further shown in FIG. 9, in some aspects, process 900 may include transmitting or receiving the communications in the plurality of TTIs in accordance with the DCI (block 920). For example, the UE (using antenna 252, DEMOD 254, MIMO detector 256, receive processor 258, controller/processor 280, transmit processor 264, TX MIMO processor 266, MOD 254, among other examples) may transmit or receive the communications in the plurality of TTIs in accordance with the DCI, as described above.

In some examples, transmitting or receiving the communications includes transmitting or receiving the communications using spatial division multiplexing, frequency division multiplexing, or time division multiplexing. In some examples, transmitting or receiving the communications includes transmitting or receiving the communications concurrently using multiple TCI states. In some other examples, transmitting or receiving the communications includes transmitting or receiving the communications non-concurrently (that is, sequentially) using multiple TCI states. In some examples, process 900 includes performing rate matching of the communications around other resources scheduled for another communication in one or more of the plurality of TTIs.

Process 900 may include additional aspects, such as any single aspect or any combination of aspects described below or in connection with one or more other processes described elsewhere herein.

In a first aspect, a first communication, of the communications, associated with a first TCI state, of the plurality of TCI states, is associated with a first redundancy version of a transport block, and a second communication, of the communications, associated with a second TCI state, of the plurality of TCI states, is associated with a second redundancy version of the transport block. In a second additional aspect, alone or in combination with the first aspect, a first communication, of the communications, associated with a first TCI state, of the plurality of TCI states, is associated with a first transport block, and a second communication, of the communications, associated with a second TCI state, of the plurality of TCI states, is associated with a second transport block.

In a third additional aspect, alone or in combination with one or more of the first and second aspects, time domain resource assignments of the resources for a first TCI state, of the plurality of TCI states, are the same as time domain resource assignments of the resources for a second TCI state of the plurality of TCI states, and frequency domain resource assignments of the resources for the first TCI state overlap with frequency domain resource assignments of the resources for the second TCI state. In a fourth additional aspect, alone or in combination with one or more of the first through third aspects, the communications are transmitted or received using spatial division multiplexing.

In a fifth additional aspect, alone or in combination with one or more of the first through fourth aspects, the DCI commonly indicates the time domain resource assignments of the resources for the first TCI state and the time domain resource assignments of the resources for the second TCI state, and the DCI commonly indicates the frequency domain resource assignments of the resources for the first TCI state and the frequency domain resource assignments of the resources for the second TCI state.

In a sixth additional aspect, alone or in combination with one or more of the first through fifth aspects, the frequency domain resource assignments of the resources for the first TCI state overlap with the frequency domain resource assignments of the resources for the second TCI state in a first component carrier and in a second component carrier.

In a seventh additional aspect, alone or in combination with one or more of the first through sixth aspects, time domain resource assignments of the resources for a first TCI state, of the plurality of TCI states, are the same as time domain resource assignments of the resources for a second TCI state of the plurality of TCI states, and frequency domain resource assignments of the resources for the first TCI state do not overlap with frequency domain resource assignments of the resources for the second TCI state. In an eighth additional aspect, alone or in combination with one or more of the first through seventh aspects, the communications are transmitted or received using frequency division multiplexing.

In a ninth additional aspect, alone or in combination with one or more of the first through eighth aspects, the DCI commonly indicates the time domain resource assignments of the resources for the first TCI state and the time domain resource assignments of the resources for the second TCI state, and the DCI separately indicates the frequency domain resource assignments of the resources for the first TCI state and the frequency domain resource assignments of the resources for the second TCI state.

In a tenth additional aspect, alone or in combination with one or more of the first through ninth aspects, the frequency domain resource assignments of the resources for the first TCI state are in a first component carrier, and the frequency domain resource assignments of the resources for the second TCI state are in a second component carrier.

In an eleventh additional aspect, alone or in combination with one or more of the first through tenth aspects, time domain resource assignments of the resources for a first TCI state, of the plurality of TCI states, are different than time domain resource assignments of the resources for a second TCI state of the plurality of TCI states, and frequency domain resource assignments of the resources for the first TCI state are different than frequency domain resource assignments of the resources for the second TCI state. In a twelfth additional aspect, alone or in combination with one or more of the first through eleventh aspects, the DCI separately indicates the time domain resource assignments of the resources for the first TCI state and the time domain resource assignments of the resources for the second TCI state, and the DCI separately indicates the frequency domain resource assignments of the resources for the first TCI state and the frequency domain resource assignments of the resources for the second TCI state. In a thirteenth additional aspect, alone or in combination with one or more of the first through twelfth aspects, the UE is not enabled to concurrently communicate using multiple TCI states.

In a fourteenth additional aspect, alone or in combination with one or more of the first through thirteenth aspects, frequency domain resource assignments of the resources for a first TCI state, of the plurality of TCI states, are in accordance with a first frequency hopping pattern, and frequency domain resource assignments of the resources for a second TCI state, of the plurality of TCI states, are in accordance with a second frequency hopping pattern. In a fifteenth additional aspect, alone or in combination with one or more of the first through fourteenth aspects, the communications are transmitted or received using time division multiplexing. In a sixteenth additional aspect, alone or in combination with one or more of the first through fifteenth aspects, the UE is enabled to concurrently communicate using multiple TCI states.

In a seventeenth additional aspect, alone or in combination with one or more of the first through sixteenth aspects, time domain resource assignments of the resources for a first TCI state, of the plurality of TCI states, partially overlap with time domain resource assignments of the resources for a second TCI state of the plurality of TCI states, and frequency domain resource assignments of the resources for the first TCI state partially overlap with frequency domain resource assignments of the resources for the second TCI state. In an eighteenth additional aspect, alone or in combination with one or more of the first through seventeenth aspects, the frequency domain resource assignments of the resources for the first TCI state and the frequency domain resource assignments of the resources for the second TCI state are rate matched around other resources scheduled for another communication in one or more of the plurality of TTIs.

In a nineteenth additional aspect, alone or in combination with one or more of the first through eighteenth aspects, the DCI identifies a first time domain resource assignment and frequency domain resource assignment in a first component carrier, and process 900 includes determining a second time domain resource assignment and frequency domain resource assignment in a second component carrier based at least in part on the first time domain resource assignment and frequency domain resource assignment. In a twentieth additional aspect, alone or in combination with one or more of the first through nineteenth aspects, transmitting or receiving the communications includes transmitting a retransmission of a first communication, of the communications, using a first TCI state, of the plurality of TCI states, and transmitting an initial transmission of a second communication, of the communications, using a second TCI state of the plurality of TCI states. In a twenty-first additional aspect, alone or in combination with one or more of the first through twentieth aspects, process 900 includes transmitting information indicating whether the UE is enabled to concurrently communicate using multiple TCI states, and the resources indicated by the DCI are based at least in part on whether the UE is enabled to concurrently communicate using multiple TCI states.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
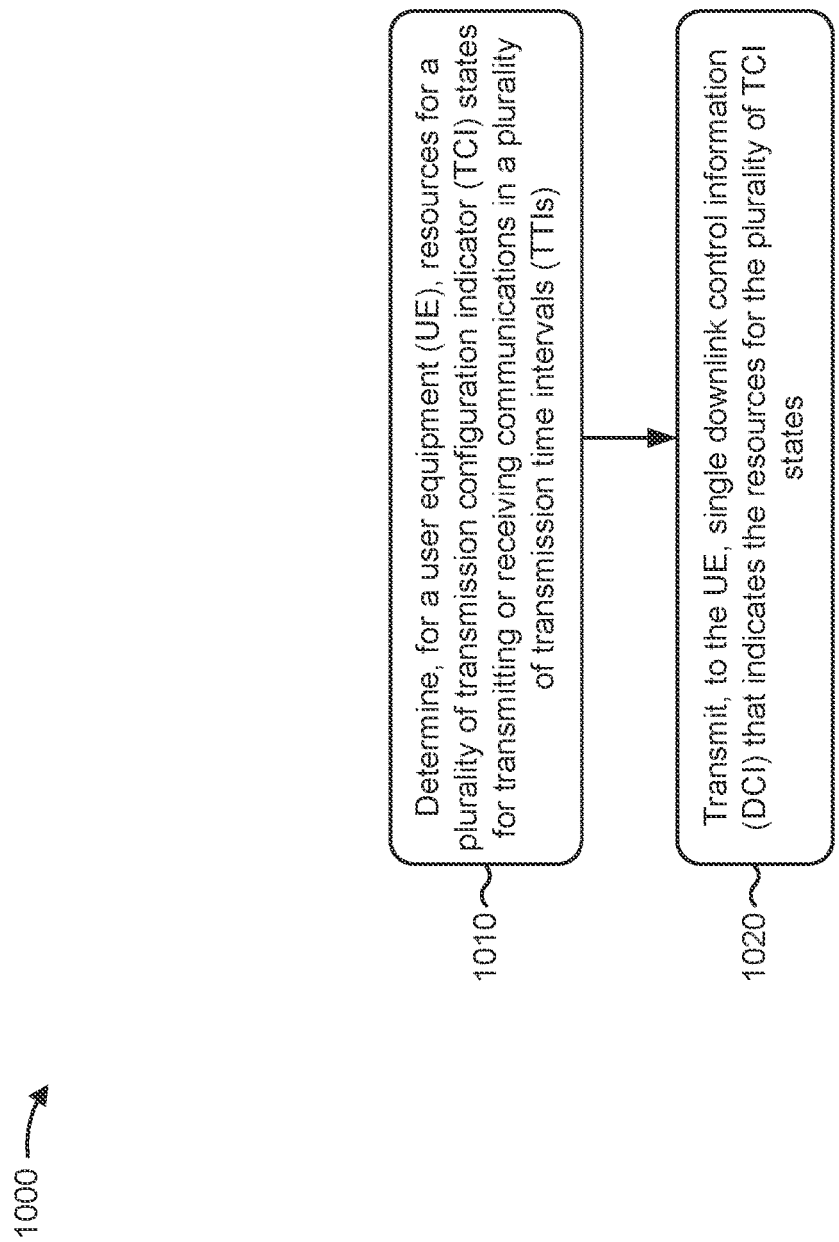
FIG. 10 is a flowchart illustrating an example process performed by a BS in accordance with various aspects of the present disclosure.

FIG. 10 is a diagram illustrating an example process 1000 performed, for example, by a BS, in accordance with various aspects of the present disclosure. Example process 1000 is an example where a BS, such as BS 110, performs operations associated with scheduling resources for multiple TCI states in multiple TTIs using single DCI.

As shown in FIG. 10, in some aspects, process 1000 may include determining, for a UE, resources for a plurality of TCI states for transmitting or receiving communications in a plurality of TTIs (block 1010). For example, the BS (using controller/processor 240, among other examples) may determine, for a UE, resources for a plurality of TCI states for transmitting or receiving communications in a plurality of TTIs, as described above.

As further shown in FIG. 10, in some aspects, process 1000 may include transmitting, to the UE, single DCI that indicates the resources for the plurality of TCI states (block 1020). For example, the BS (using controller/processor 240, transmit processor 220, TX MIMO processor 230, MOD 232, antenna 234, among other examples) may transmit, to the UE, single DCI that indicates the resources for the plurality of TCI states, as described above.

In some examples, process 1000 may include transmitting or receiving the communications in the plurality of TTIs in accordance with the DCI. In some examples, transmitting or receiving the communications includes transmitting or receiving the communications using spatial division multiplexing, frequency division multiplexing, or time division multiplexing. In some examples, transmitting or receiving the communications includes transmitting or receiving the communications concurrently using multiple TCI states. In some other examples, transmitting or receiving the communications includes transmitting or receiving the communications non-concurrently (that is, sequentially) using multiple TCI states. In some examples, process 900 includes performing rate matching of the communications around other resources scheduled for another communication in one or more of the plurality of TTIs.

Process 1000 may include additional aspects, such as any single aspect or any combination of aspects described below or in connection with one or more other processes described elsewhere herein.

In a first aspect, a first communication, of the communications, associated with a first TCI state, of the plurality of TCI states, is associated with a first redundancy version of a transport block, and a second communication, of the communications, associated with a second TCI state, of the plurality of TCI states, is associated with a second redundancy version of the transport block. In a second additional aspect, alone or in combination with the first aspect, a first communication, of the communications, associated with a first TCI state, of the plurality of TCI states, is associated with a first transport block, and a second communication, of the communications, associated with a second TCI state, of the plurality of TCI states, is associated with a second transport block.

In a third additional aspect, alone or in combination with one or more of the first and second aspects, time domain resource assignments of the resources for a first TCI state, of the plurality of TCI states, are the same as time domain resource assignments of the resources for a second TCI state of the plurality of TCI states, and frequency domain resource assignments of the resources for the first TCI state overlap with frequency domain resource assignments of the resources for the second TCI state. In a fourth additional aspect, alone or in combination with one or more of the first through third aspects, the communications are to be transmitted or received using spatial division multiplexing.

In a fifth additional aspect, alone or in combination with one or more of the first through fourth aspects, the DCI commonly indicates the time domain resource assignments of the resources for the first TCI state and the time domain resource assignments of the resources for the second TCI state, and the DCI commonly indicates the frequency domain resource assignments of the resources for the first TCI state and the frequency domain resource assignments of the resources for the second TCI state.

In a sixth additional aspect, alone or in combination with one or more of the first through fifth aspects, the frequency domain resource assignments of the resources for the first TCI state overlap with the frequency domain resource assignments of the resources for the second TCI state in a first component carrier and in a second component carrier.

In a seventh additional aspect, alone or in combination with one or more of the first through sixth aspects, time domain resource assignments of the resources for a first TCI state, of the plurality of TCI states, are the same as time domain resource assignments of the resources for a second TCI state of the plurality of TCI states, and frequency domain resource assignments of the resources for the first TCI state do not overlap with frequency domain resource assignments of the resources for the second TCI state. In an eighth additional aspect, alone or in combination with one or more of the first through seventh aspects, the communications are to be transmitted or received using frequency division multiplexing.

In a ninth additional aspect, alone or in combination with one or more of the first through eighth aspects, the DCI commonly indicates the time domain resource assignments of the resources for the first TCI state and the time domain resource assignments of the resources for the second TCI state, and the DCI separately indicates the frequency domain resource assignments of the resources for the first TCI state and the frequency domain resource assignments of the resources for the second TCI state.

In a tenth additional aspect, alone or in combination with one or more of the first through ninth aspects, the frequency domain resource assignments of the resources for the first TCI state are in a first component carrier, and the frequency domain resource assignments of the resources for the second TCI state are in a second component carrier.

In an eleventh additional aspect, alone or in combination with one or more of the first through tenth aspects, time domain resource assignments of the resources for a first TCI state, of the plurality of TCI states, are different than time domain resource assignments of the resources for a second TCI state of the plurality of TCI states, and frequency domain resource assignments of the resources for the first TCI state are different than frequency domain resource assignments of the resources for the second TCI state. In a twelfth additional aspect, alone or in combination with one or more of the first through eleventh aspects, the DCI separately indicates the time domain resource assignments of the resources for the first TCI state and the time domain resource assignments of the resources for the second TCI state, and the DCI separately indicates the frequency domain resource assignments of the resources for the first TCI state and the frequency domain resource assignments of the resources for the second TCI state. In a thirteenth additional aspect, alone or in combination with one or more of the first through twelfth aspects, the UE is not enabled to concurrently communicate using multiple TCI states.

In a fourteenth additional aspect, alone or in combination with one or more of the first through thirteenth aspects, frequency domain resource assignments of the resources for a first TCI state, of the plurality of TCI states, are in accordance with a first frequency hopping pattern, and frequency domain resource assignments of the resources for a second TCI state, of the plurality of TCI states, are in accordance with a second frequency hopping pattern. In a fifteenth additional aspect, alone or in combination with one or more of the first through fourteenth aspects, the communications are to be transmitted or received using time division multiplexing. In a sixteenth additional aspect, alone or in combination with one or more of the first through fifteenth aspects, the UE is enabled to concurrently communicate using multiple TCI states.

In a seventeenth additional aspect, alone or in combination with one or more of the first through sixteenth aspects, time domain resource assignments of the resources for a first TCI state, of the plurality of TCI states, partially overlap with time domain resource assignments of the resources for a second TCI state of the plurality of TCI states, and frequency domain resource assignments of the resources for the first TCI state partially overlap with frequency domain resource assignments of the resources for the second TCI state. In an eighteenth additional aspect, alone or in combination with one or more of the first through seventeenth aspects, the frequency domain resource assignments of the resources for the first TCI state and the frequency domain resource assignments of the resources for the second TCI state are rate matched around other resources scheduled for another communication in one or more of the plurality of TTIs.

In a nineteenth additional aspect, alone or in combination with one or more of the first through eighteenth aspects, the DCI identifies a first time domain resource assignment and frequency domain resource assignment in a first component carrier to enable the UE to determine a second time domain resource assignment and frequency domain resource assignment in a second component carrier based at least in part on the first time domain resource assignment and frequency domain resource assignment. In a twentieth additional aspect, alone or in combination with one or more of the first through nineteenth aspects, the DCI schedules a retransmission of a first communication, of the communications, using a first TCI state, of the plurality of TCI states, and schedules an initial transmission of a second communication, of the communications, using a second TCI state of the plurality of TCI states. In a twenty-first additional aspect, alone or in combination with one or more of the first through twentieth aspects, process 900 includes receiving information indicating whether the UE is enabled to concurrently communicate using multiple TCI states, and the resources indicated by the DCI are based at least in part on whether the UE is enabled to concurrently communicate using multiple TCI states.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
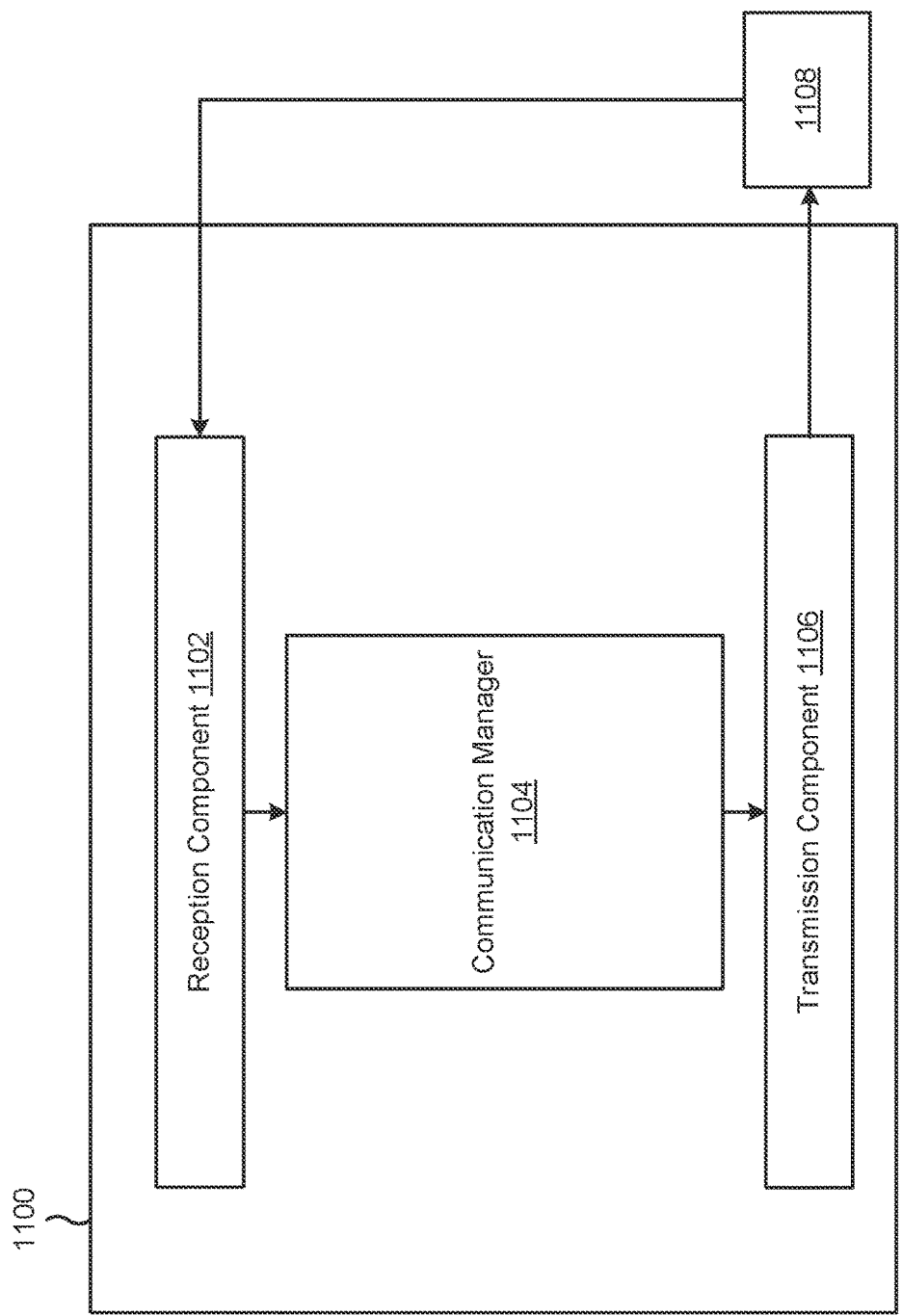
FIGS. 11-12 are diagrams illustrating example apparatuses for wireless communication in accordance with various aspects of the present disclosure.

FIG. 11 is a diagram illustrating an example apparatus 1100 for wireless communication in accordance with various aspects of the present disclosure. The apparatus 1100 may be a UE, or a UE may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 7 and 8A-8H. Additionally or alternatively, the apparatus 1100 may be configured to perform one or more processes described herein, such as process 900 of FIG. 9, or a combination thereof. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG. 2. In some aspects, the transmission component 1106 may be co-located with the reception component 1102 in a transceiver.

The communication manager 1104 may receive or may cause the reception component 1102 to receive single DCI that indicates resources for a plurality of TCI states for transmitting or receiving communications in a plurality of TTIs. The communication manager 1104 may transmit or may cause the transmission component 1106 to transmit the communications in the plurality of TTIs in accordance with the DCI. Alternatively, the communication manager 1104 may receive or may cause the reception component 1102 to receive the communications in the plurality of TTIs in accordance with the DCI. In some aspects, the DCI identifies a first time domain resource assignment and frequency domain resource assignment in a first component carrier, and the communication manager 1104 may determine a second time domain resource assignment and frequency domain resource assignment in a second component carrier based at least in part on the first time domain resource assignment and frequency domain resource assignment. In some aspects, the communication manager 1104 may perform one or more operations described elsewhere herein as being performed by one or more components of the communication manager 1104.

The communication manager 1104 may include a controller/processor, a memory, or a combination thereof, of the UE described above in connection with FIG. 2. In some aspects, the communication manager 1104 includes a set of components associated with performing operations described herein. Alternatively, the set of components may be separate and distinct from the communication manager 1104. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1102 may receive single DCI that indicates resources for a plurality of TCI states for transmitting or receiving communications in a plurality of TTIs. In some aspects, the transmission component 1106 may transmit the communications in the plurality of TTIs in accordance with the DCI. The transmission component 1106 may transmit the communications using spatial division multiplexing, frequency division multiplexing, or time division multiplexing. The transmission component 1106 may perform rate matching of the communications around other resources scheduled for another communication in the one or more of the plurality of TTIs. The transmission component 1106 may concurrently transmit the communications using multiple TCI states. Alternatively, the transmission component 1106 may not concurrently transmit (that is, sequentially transmit) the communications using multiple TCI states. In some aspects, the transmission component 1106 may transmit a retransmission of a first communication, of the communications, using a first TCI state, of the plurality of TCI states, and transmit an initial transmission of a second communication, of the communications, using a second TCI state of the plurality of TCI states. In some aspects, the transmission component 1106 may transmit information indicating whether the apparatus 1100 is enabled to concurrently communicate using multiple TCI states.

In some aspects, the reception component 1102 may receive the communications in the plurality of TTIs in accordance with the DCI. The reception component 1102 may receive the communications using spatial division demultiplexing, frequency division demultiplexing, or time division demultiplexing. The reception component 1102 may perform de-rate matching of the communications around other resources scheduled for another communication in the one or more of the plurality of TTIs. The reception component 1102 may concurrently receive the communications using multiple TCI states. Alternatively, the reception component 1102 may not concurrently receive (that is, sequentially receive) the communications using multiple TCI states.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
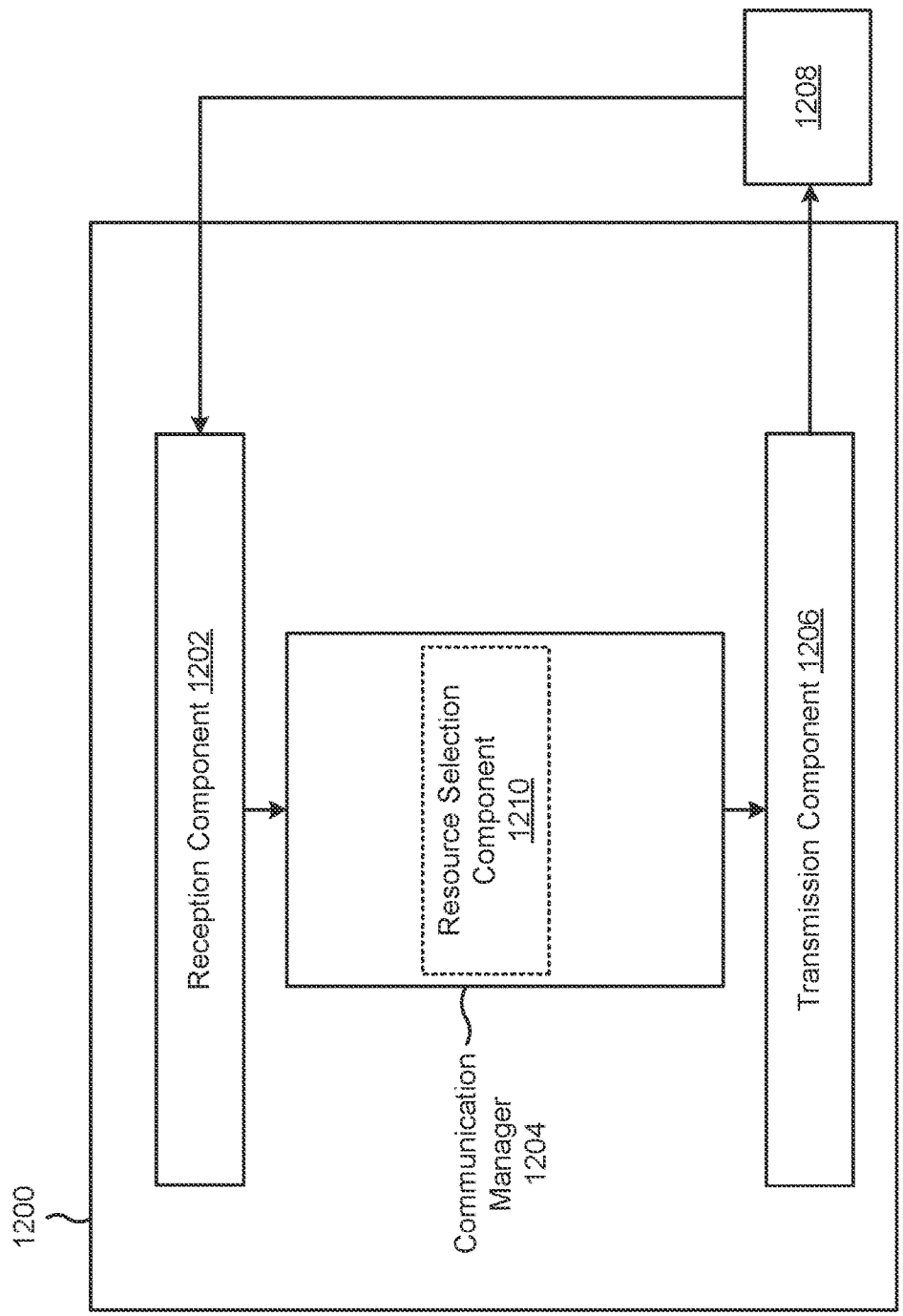

FIG. 12 is a diagram illustrating an example apparatus 1200 for wireless communication in accordance with various aspects of the present disclosure. The apparatus 1200 may be a base station, or a base station may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 7 and 8A-8H. Additionally or alternatively, the apparatus 1200 may be configured to perform one or more processes described herein, such as process 1000 of FIG. 10, or a combination thereof. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may determine, for a UE, resources for a plurality of TCI states for transmitting or receiving communications in a plurality of TTIs. The communication manager 1204 may transmit or may cause the transmission component 1206 to transmit, to the UE, single DCI that indicates the resources for the plurality of TCI states. In some aspects, the communication manager 1204 may perform one or more operations described elsewhere herein as being performed by one or more components of the communication manager 1204.

The communication manager 1204 may include a controller/processor, a memory, a scheduler, a communication unit, or a combination thereof, of the base station described above in connection with FIG. 2. In some aspects, the communication manager 1204 includes a set of components, such as a resource selection component 1210. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The resource selection component 1210 may determine, for a UE, resources for a plurality of TCI states for transmitting or receiving communications in a plurality of TTIs. The transmission component 1206 may transmit, to the UE, single DCI that indicates the resources for the plurality of TCI states. In some aspects, the transmission component 1206 may transmit the communications in the plurality of TTIs in accordance with the DCI. The transmission component 1206 may transmit the communications using spatial division multiplexing, frequency division multiplexing, or time division multiplexing. The transmission component 1206 may perform rate matching of the communications around other resources scheduled for another communication in the one or more of the plurality of TTIs. The transmission component 1206 may concurrently transmit the communications using multiple TCI states. Alternatively, the transmission component 1206 may not concurrently transmit (that is, sequentially transmit) the communications using multiple TCI states.

In some aspects, the reception component 1202 may receive the communications in the plurality of TTIs in accordance with the DCI. The reception component 1202 may receive the communications using spatial division demultiplexing, frequency division demultiplexing, or time division demultiplexing. The reception component 1202 may perform de-rate matching of the communications around other resources scheduled for another communication in the one or more of the plurality of TTIs. The reception component 1202 may concurrently receive the communications using multiple TCI states. Alternatively, the reception component 1202 may not concurrently receive (that is, sequentially receive) the communications using multiple TCI states. In some aspects, the reception component 1202 may receive information indicating whether the apparatus 1208 is enabled to concurrently communicate using multiple TCI states.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving single downlink control information (DCI) that indicates resources for a plurality of transmission configuration indicator (TCI) states for transmitting or receiving frequency division multiplexed (FDMed) communications, wherein the single DCI indicates different frequency domain resource assignments of the resources for a first TCI state and a second TCI state of the plurality of TCI states; and
   transmitting or receiving the FDMed communications in accordance with the single DCI.

2. The method of claim 1, wherein first frequency domain resource assignments of the resources for the first TCI state do not overlap with second frequency domain resource assignments of the resources for the second TCI state.

3. The method of claim 1, wherein the single DCI indicates a common set of time domain resource assignments for the first TCI state and the second TCI state.

4. The method of claim 1, wherein the single DCI further indicates resources for a third TCI state and a fourth TCI state for transmitting or receiving other communications, and wherein the single DCI indicates different time domain resource assignments for the third TCI state and the fourth TCI state.

5. The method of claim 4, wherein the other communications are time division multiplexed (TDMed) over a plurality of transmission time intervals (TTIs).

6. The method of claim 1, wherein the FDMed communications are FDMed over a plurality of transmission time intervals (TTIs).

7. The method of claim 1, wherein the resources are physical downlink shared channel (PDSCH) resources.

8. The method of claim 1, further comprising:
   transmitting information indicating that the UE is enabled to concurrently communicate using multiple TCI states.

9. A user equipment (UE) for wireless communication, comprising:
   a processing system that includes one or more processors and one or more memories coupled with the one or more processors, the processing system configured to cause the UE to:
   receive single downlink control information (DCI) that indicates resources for a plurality of transmission configuration indicator (TCI) states for transmitting or receiving frequency division multiplexed (FDMed) communications, wherein the single DCI indicates different frequency domain resource assignments of the resources for a first TCI state and a second TCI state of the plurality of TCI states; and
   transmit or receive the FDMed communications in accordance with the single DCI.

10. The UE of claim 9, wherein first frequency domain resource assignments of the resources for the first TCI state do not overlap with second frequency domain resource assignments of the resources for the second TCI state.

11. The UE of claim 9, wherein the single DCI indicates a common set of time domain resource assignments for the first TCI state and the second TCI state.

12. The UE of claim 9, wherein the single DCI further indicates resources for a third TCI state and a fourth TCI state for transmitting or receiving other communications, and wherein the single DCI indicates different time domain resource assignments for the third TCI state and the fourth TCI state.

13. The UE of claim 12, wherein the other communications are time division multiplexed (TDMed) over a plurality of transmission time intervals (TTIs).

14. The UE of claim 9, wherein the FDMed communications are FDMed over a plurality of transmission time intervals (TTIs).

15. The UE of claim 9, wherein the resources are physical downlink shared channel (PDSCH) resources.

16. The UE of claim 9, wherein the processing system is further configured to cause the UE to:
   transmit information indicating that the UE is enabled to concurrently communicate using multiple TCI states.

17. A method of wireless communication performed by a network entity, comprising:
   determining, for a user equipment (UE), resources for a plurality of transmission configuration indicator (TCI) states for transmitting or receiving frequency division multiplexed (FDMed) communications; and
   transmitting, to the UE, single downlink control information (DCI) that indicates the resources for the plurality of TCI states, wherein the single DCI indicates different frequency domain resource assignments of the resources for a first TCI state and a second TCI state of the plurality of TCI states.

18. The method of claim 17, wherein first frequency domain resource assignments of the resources for the first TCI state do not overlap with second frequency domain resource assignments of the resources for the second TCI state.

19. The method of claim 17, wherein the single DCI indicates a common set of time domain resource assignments for the first TCI state and the second TCI state.

20. The method of claim 17, wherein the single DCI further indicates resources for a third TCI state and a fourth TCI state for transmitting or receiving other communications, and wherein the single DCI indicates different time domain resource assignments for the first TCI state and the second TCI state.

21. The method of claim 20, wherein the other communications are time division multiplexed (TDMed) over a plurality of transmission time intervals (TTIs).

22. The method of claim 17, wherein the FDMed communications are FDMed over a plurality of transmission time intervals (TTIs).

23. The method of claim 17, wherein the resources are physical downlink shared channel (PDSCH) resources.

24. The method of claim 17, further comprising:
receiving information indicating that the UE is enabled to concurrently communicate using multiple TCI states.

25. A network entity for wireless communication, comprising:
a processing system that includes one or more processors and one or more memories coupled with the one or more processors, the processing system configured to cause the network entity to:
determine, for a user equipment (UE), resources for a plurality of transmission configuration indicator (TCI) states for transmitting or receiving frequency division multiplexed (FDMed) communications; and
transmit, to the UE, single downlink control information (DCI) that indicates the resources for the plurality of TCI states, wherein the single DCI indicates different frequency domain resource assignments of the resources for a first TCI state and a second TCI state of the plurality of TCI states.

26. The network entity of claim 25, wherein first frequency domain resource assignments of the resources for the first TCI state do not overlap with second frequency domain resource assignments of the resources for the second TCI state.

27. The network entity of claim 25, wherein the single DCI indicates a common set of time domain resource assignments for the first TCI state and the second TCI state.

28. The network entity of claim 25, wherein the single DCI further indicates resources for a third TCI state and a fourth TCI state for transmitting or receiving other communications, and wherein the single DCI indicates different time domain resource assignments for the first TCI state and the second TCI state.

29. The network entity of claim 28, wherein the other communications are time division multiplexed (TDMed) over a plurality of transmission time intervals (TTIs).

30. The network entity of claim 25, wherein the resources are physical downlink shared channel (PDSCH) resources.

* * * * *